United States Patent
Ahn et al.

(10) Patent No.: US 9,264,370 B1
(45) Date of Patent: Feb. 16, 2016

(54) CORRELATING PACKETS IN COMMUNICATIONS NETWORKS

(71) Applicant: Centripetal Networks, Inc., Herndon, VA (US)

(72) Inventors: David K. Ahn, Winston-Salem, NC (US); Peter P. Geremia, Portsmouth, NH (US); Pierre Mallett, III, Herndon, VA (US); Sean Moore, Hollis, NH (US); Robert T. Perry, Ashburn, VA (US)

(73) Assignee: Centripetal Networks, Inc., Herndon, VA (US)

( * ) Notice: Subject to any disclaimer, the term of this patent is extended or adjusted under 35 U.S.C. 154(b) by 0 days.

(21) Appl. No.: 14/618,967

(22) Filed: Feb. 10, 2015

(51) Int. Cl.
*H04L 12/851* (2013.01)
*H04L 12/26* (2006.01)
*H04L 12/741* (2013.01)
*H04L 29/12* (2006.01)
*H04L 12/823* (2013.01)

(52) U.S. Cl.
CPC ............ *H04L 47/2483* (2013.01); *H04L 43/04* (2013.01); *H04L 43/0858* (2013.01); *H04L 43/106* (2013.01); *H04L 45/745* (2013.01); *H04L 47/32* (2013.01); *H04L 61/2567* (2013.01)

(58) Field of Classification Search
CPC ..... H04L 69/22; H04L 12/2605; H04L 43/04; H04L 45/745; H04L 43/12; H04L 47/2483; H04L 43/0858; H04L 47/32; H04L 61/2567; H04L 43/106
USPC .............. 370/241, 351, 352, 356, 389, 395.1, 370/395.3, 395.31, 464, 474
See application file for complete search history.

(56) References Cited

U.S. PATENT DOCUMENTS

| | | | |
|---|---|---|---|
| 6,226,372 B1 | 5/2001 | Beebe et al. | |
| 6,317,837 B1 | 11/2001 | Kenworthy | |
| 6,611,875 B1 | 8/2003 | Chopra et al. | |
| 7,478,429 B2 | 1/2009 | Lyon | |
| 7,539,186 B2 | 5/2009 | Aerrabotu et al. | |

(Continued)

FOREIGN PATENT DOCUMENTS

| | | |
|---|---|---|
| EP | 1313290 A1 | 5/2003 |
| EP | 1677484 A2 | 7/2006 |

(Continued)

OTHER PUBLICATIONS

Greenwald et al., Designing an Academic Firewall: Policy, Practice, and Experience With SURF, Proceedings of SNDSS '96, IEEE, 1996, Department of Computer Science, Stanford University, Stanford, CA.

(Continued)

*Primary Examiner* — Obaidul Huq
(74) *Attorney, Agent, or Firm* — Banner & Witcoff, Ltd.

(57) ABSTRACT

A computing system may identify packets received by a network device from a host located in a first network and may generate log entries corresponding to the packets received by the network device. The computing system may identify packets transmitted by the network device to a host located in a second network and may generate log entries corresponding to the packets transmitted by the network device. Utilizing the log entries corresponding to the packets received by the network device and the log entries corresponding to the packets transmitted by the network device, the computing system may correlate the packets transmitted by the network device with the packets received by the network device.

207 Claims, 7 Drawing Sheets

(56) References Cited

U.S. PATENT DOCUMENTS

| | | | |
|---|---|---|---|
| 7,684,400 | B2 | 3/2010 | Govindarajan et al. |
| 7,710,885 | B2 | 5/2010 | Ilnicki et al. |
| 7,721,084 | B2 | 5/2010 | Salminen et al. |
| 7,818,794 | B2 | 10/2010 | Wittman |
| 8,004,994 | B1* | 8/2011 | Darisi et al. ............ 370/241 |
| 8,306,994 | B2 | 11/2012 | Kenworthy |
| 8,726,379 | B1 | 5/2014 | Stiansen et al. |
| 8,806,638 | B1 | 8/2014 | Mani |
| 8,856,926 | B2 | 10/2014 | Narayanaswamy et al. |
| 8,935,785 | B2 | 1/2015 | Pandrangi |
| 9,094,445 | B2 | 7/2015 | Moore et al. |
| 9,124,552 | B2 | 9/2015 | Moore |
| 9,137,205 | B2 | 9/2015 | Rogers et al. |
| 9,160,713 | B2 | 10/2015 | Moore |
| 2001/0039624 | A1 | 11/2001 | Kellum |
| 2002/0049899 | A1 | 4/2002 | Kenworthy |
| 2003/0035370 | A1 | 2/2003 | Brustoloni |
| 2003/0097590 | A1 | 5/2003 | Syvanne |
| 2003/0123456 | A1 | 7/2003 | Denz et al. |
| 2003/0142681 | A1 | 7/2003 | Chen et al. |
| 2003/0145225 | A1 | 7/2003 | Bruton, III et al. |
| 2003/0154297 | A1* | 8/2003 | Suzuki et al. ............ 709/229 |
| 2003/0188192 | A1 | 10/2003 | Tang et al. |
| 2003/0212900 | A1 | 11/2003 | Liu et al. |
| 2004/0088542 | A1 | 5/2004 | Daude et al. |
| 2004/0151155 | A1 | 8/2004 | Jouppi |
| 2005/0117576 | A1 | 6/2005 | McDysan et al. |
| 2005/0138204 | A1 | 6/2005 | Iyer et al. |
| 2005/0141537 | A1 | 6/2005 | Kumar et al. |
| 2006/0048142 | A1 | 3/2006 | Roese et al. |
| 2006/0114899 | A1* | 6/2006 | Toumura et al. ............ 370/389 |
| 2006/0136987 | A1 | 6/2006 | Okuda |
| 2006/0146879 | A1 | 7/2006 | Anthias et al. |
| 2006/0195896 | A1 | 8/2006 | Fulp et al. |
| 2006/0212572 | A1 | 9/2006 | Afek et al. |
| 2006/0248580 | A1 | 11/2006 | Fulp et al. |
| 2007/0083924 | A1 | 4/2007 | Lu |
| 2007/0240208 | A1 | 10/2007 | Yu et al. |
| 2008/0005795 | A1 | 1/2008 | Acharya et al. |
| 2008/0072307 | A1 | 3/2008 | Maes |
| 2008/0235755 | A1 | 9/2008 | Blaisdell et al. |
| 2009/0172800 | A1 | 7/2009 | Wool |
| 2009/0328219 | A1 | 12/2009 | Narayanaswamy |
| 2010/0011434 | A1 | 1/2010 | Kay |
| 2010/0082811 | A1 | 4/2010 | Van Der Merwe et al. |
| 2010/0132027 | A1 | 5/2010 | Ou |
| 2010/0211678 | A1 | 8/2010 | McDysan et al. |
| 2010/0242098 | A1 | 9/2010 | Kenworthy |
| 2010/0296441 | A1 | 11/2010 | Barkan |
| 2011/0055916 | A1 | 3/2011 | Ahn |
| 2011/0088092 | A1 | 4/2011 | Nguyen et al. |
| 2011/0185055 | A1* | 7/2011 | Nappier et al. ............ 709/224 |
| 2011/0270956 | A1 | 11/2011 | McDysan et al. |
| 2012/0113987 | A1 | 5/2012 | Riddoch et al. |
| 2012/0240135 | A1 | 9/2012 | Risbood et al. |
| 2012/0264443 | A1 | 10/2012 | Ng et al. |
| 2012/0314617 | A1 | 12/2012 | Erichsen et al. |
| 2012/0331543 | A1* | 12/2012 | Bostrom et al. ............ 726/13 |
| 2013/0059527 | A1 | 3/2013 | Hasesaka et al. |
| 2013/0061294 | A1 | 3/2013 | Kenworthy |
| 2013/0254766 | A1* | 9/2013 | Zuo et al. ............ 718/1 |
| 2014/0115654 | A1 | 4/2014 | Rogers et al. |
| 2014/0201123 | A1 | 7/2014 | Ahn et al. |
| 2014/0283004 | A1 | 9/2014 | Moore |
| 2014/0283030 | A1 | 9/2014 | Moore et al. |
| 2014/0366132 | A1 | 12/2014 | Stiansen et al. |
| 2015/0237012 | A1 | 8/2015 | Moore |
| 2015/0304354 | A1 | 10/2015 | Rogers et al. |

FOREIGN PATENT DOCUMENTS

| | | |
|---|---|---|
| EP | 2385676 A1 | 11/2011 |
| EP | 2498442 A1 | 9/2012 |
| WO | 2005046145 A1 | 5/2005 |

OTHER PUBLICATIONS

Reumann et al., Adaptive Packet Filters, IEEE, 2001, Department of Electrical Engineering and Computer Science, The University of Michigan, Ann Arbor, MI.

Mizuno et al., A New Remote Configurable Firewall System for Home-use Gateways, IEEE, 2004, NTT Information Sharing Platform Laboratories.

Kindervag et al., Build Security Into Your Network's DNA: The Zero Trust Network Architecture, Nov. 5, 2010, Forrester Research, Inc., Cambridge MA.

Moore, SBIR Case Study: Centripetal Networks, How CNI Leveraged DHS S&T SBIR Funding to Launch a Successful Cyber Security Company, Cyber Security Division, 2012 Principal Investigators' Meeting, Oct. 10, 2012, Centripetal Networks, Inc.

Designing a Zero Trust Network With Next-Generation Firewalls, Palo Alto Networks: Technology Brief, viewed Oct. 21, 2012, Palo Alto Networks, Santa Clara, CA.

Control Plane Policing Implementation Best Practices, Mar. 13, 2013, Cisco Systems.

International Search Report and Written Opinion for International App. No. PCT/US2013/057502, dated Nov. 7, 2013.

International Search Report and Written Opinion for International App. No. PCT/US2013/072566, dated Mar. 24, 2014.

International Search Report and Written Opinion for International App. No. PCT/US2014/023286, dated Jun. 24, 2014.

International Search Report and Written Opinion for International App. No. PCT/US2014/027723, dated Jun. 26, 2014.

International Search Report and Written Opinion for International App. No. PCT/US2015/024691, dated Sep. 16, 2015.

International Preliminary Report on Patentability for International App. No. PCT/US2013/057502, dated May 7, 2015.

International Preliminary Report on Patentability for International App. No. PCT/US2014/023286, dated Sep. 24, 2015.

International Preliminary Report on Patentability for International App. No. PCT/US2014/027723, dated Sep. 24, 2015.

Statement Re: Related Application, dated Sep. 30, 2015.

Communication Relating to the Results of the Partial International Search for International App. No. PCT/US2015/024691, dated Jul. 10, 2015.

International Preliminary Report on Patentability for International App. No. PCT/US2013/072566, dated Jul. 23, 2015.

* cited by examiner

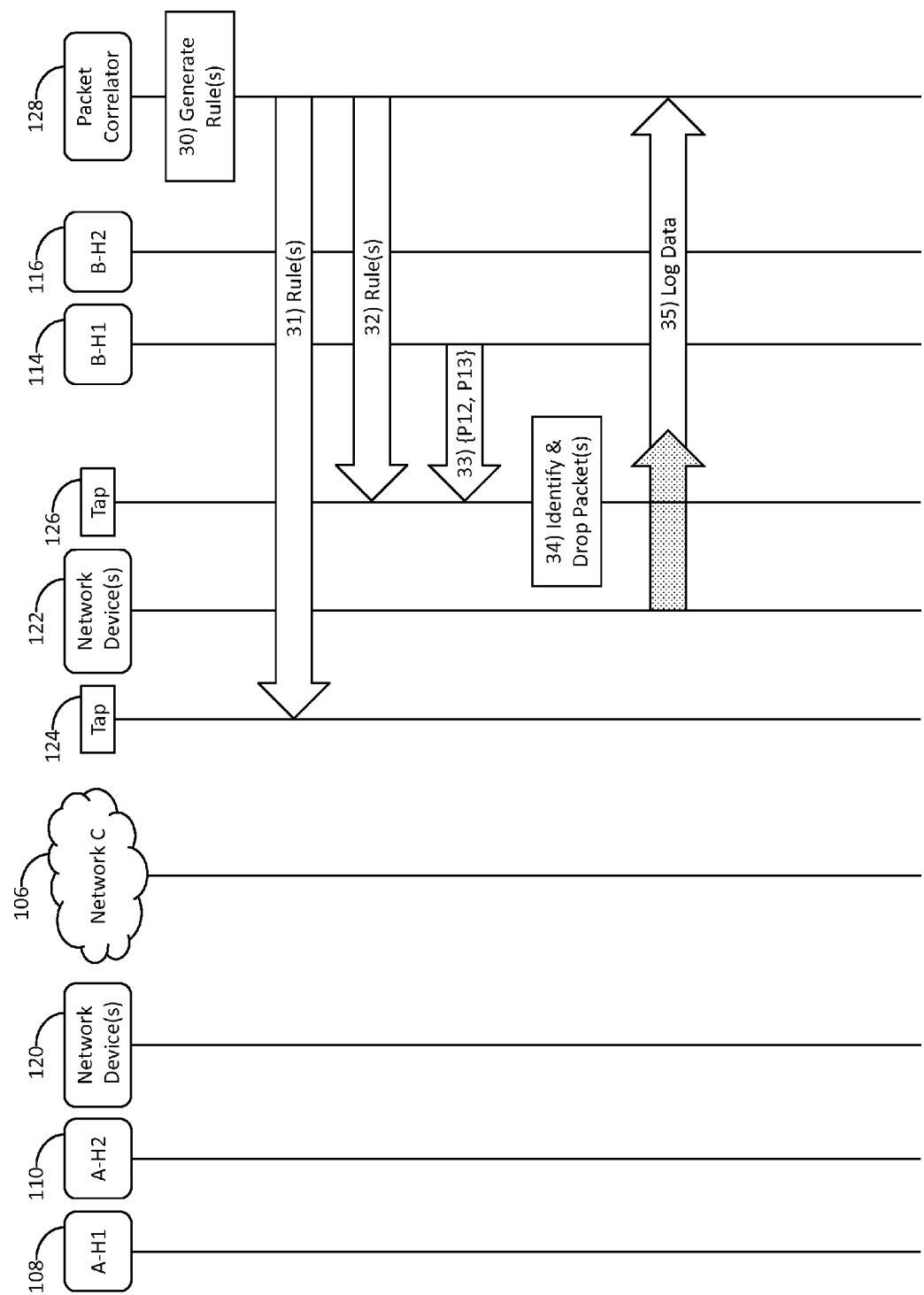

CORRELATING PACKETS IN COMMUNICATIONS NETWORKS

BACKGROUND

Communications between endpoints of packet-switched networks may be characterized as flows of associated packets. A particular flow may include packets containing information (e.g., within headers of the packets) that distinguishes the packets from packets associated with other flows. Network devices located between endpoints may alter packets associated with a flow and in doing so may potentially obfuscate the flow with which a particular packet is associated from other network devices. Accordingly, there is a need for correlating packets in communications networks.

SUMMARY

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

Aspects of this disclosure relate to correlating packets in communications networks. In accordance with embodiments of the disclosure, a computing system may identify packets received by a network device from a host located in a first network and may generate log entries corresponding to the packets received by the network device. The computing system may identify packets transmitted by the network device to a host located in a second network and may generate log entries corresponding to the packets transmitted by the network device. Utilizing the log entries corresponding to the packets received by the network device and the log entries corresponding to the packets transmitted by the network device, the computing system may correlate the packets transmitted by the network device with the packets received by the network device.

In some embodiments, the packets received by the network device may be associated with one or more flows (e.g., distinct end-to-end communication sessions); however, the network device may alter the packets in a way that obscures their association with the flow(s) from the computing system. Correlating the packets transmitted by the network device with the packets received by the network device may enable the computing system to determine that the packets transmitted by the network device are associated with the flow(s).

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein:

FIGS. 2A, 2B, 2C, and 2D depict an illustrative event sequence for correlating packets in communications networks in accordance with one or more aspects of the disclosure;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure.

Various connections between elements are discussed in the following description. These connections are general and, unless specified otherwise, may be direct or indirect, wired or wireless. In this respect, the specification is not intended to be limiting.

Figure 1:
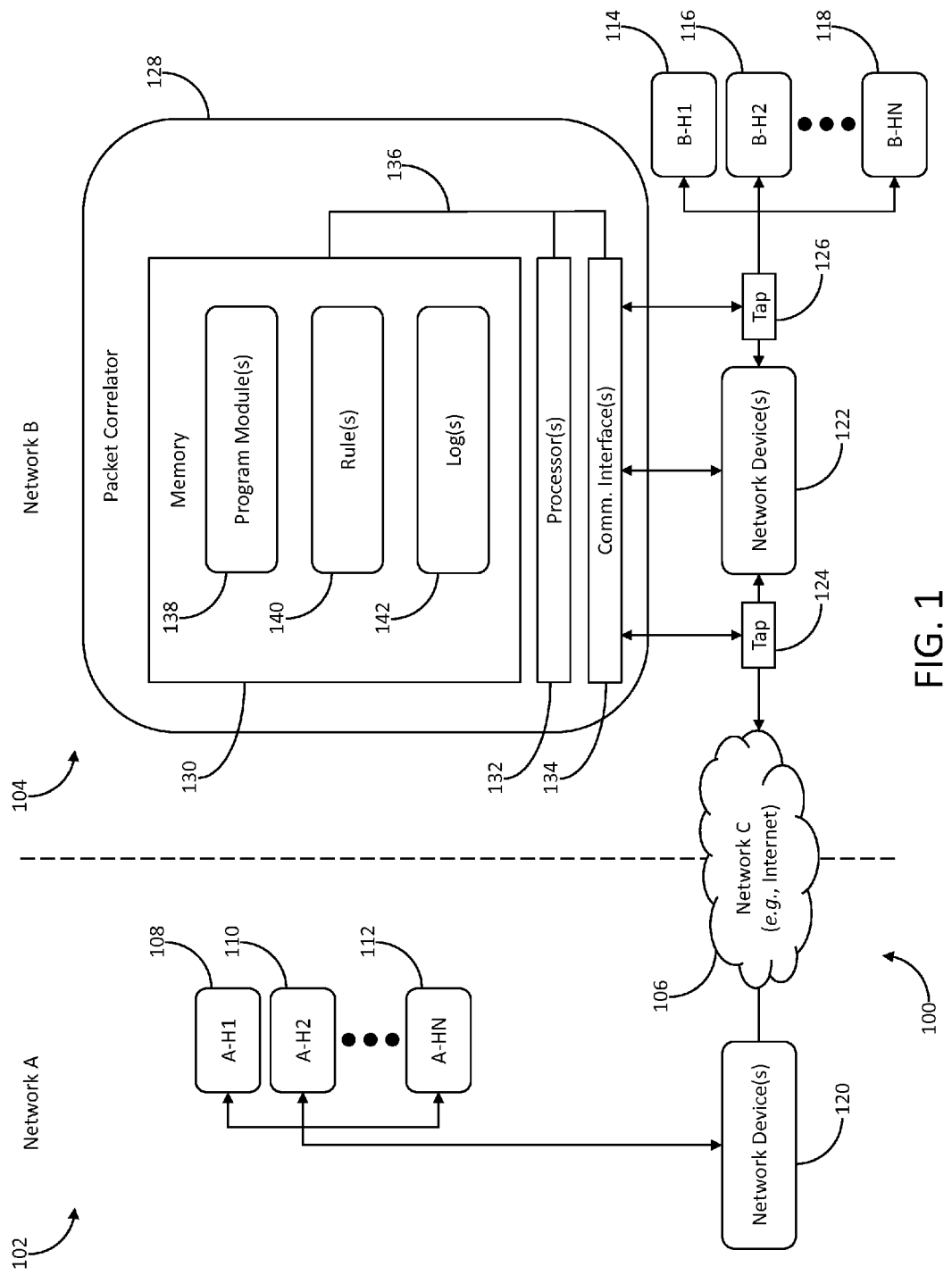
FIG. 1 depicts an illustrative environment for correlating packets in communications networks in accordance with one or more aspects of the disclosure.

FIG. 1 depicts an illustrative environment for correlating packets in communications networks in accordance with one or more aspects of the disclosure. Referring to FIG. 1, environment 100 may include networks 102, 104, and 106. Networks 102 and 104 may comprise one or more networks (e.g., Local Area Networks (LANs), Wide Area Networks (WANs), Virtual Private Networks (VPNs), or combinations thereof) associated with one or more individuals or entities (e.g., governments, corporations, service providers, or other organizations). Network 106 may comprise one or more networks (e.g., LANs, WANs, VPNs, or combinations thereof) that interface networks 102 and 104. For example, network 106 may be the Internet, a similar network, or portions thereof. Networks 102 and 104 may include one or more hosts. For example, network 102 may include hosts 108, 110, and 112. Similarly, network 104 may include hosts 114, 116, and 118. Hosts 108, 110, 112, 114, 116, and 118 may be one or more computing or network devices (e.g., servers, desktop computers, laptop computers, tablet computers, mobile devices, smartphones, routers, gateways, switches, access points, or the like), or a communication interface thereof. Networks 102 and 104 may include one or more network devices. For example, network 102 may include network device(s) 120, and network 104 may include network device(s) 122. Network device(s) 120 may include one or more devices (e.g., servers, routers, gateways, switches, access points, or the like) that interface hosts 108, 110, and 112 with network 106. Similarly, network device(s) 122 may include one or more devices that interface hosts 114, 116, and 118 with network 106.

Network 104 may include tap devices 124 and 126 and packet correlator 128. Tap device 124 may be located on or have access to a communication path that interfaces network device(s) 122 and network 106. Tap device 126 may be located on or have access to a communication path that interfaces network device(s) 122 and network 104 (e.g., one or more of hosts 114, 116, and 118). Packet correlator 128 may comprise one or more devices and may include memory 130, processor(s) 132, communication interface(s) 134, and data bus 136. Data bus 136 may interface memory 130, processor(s) 132, and communication interface(s) 134. Communication interface(s) 134 may interface packet correlator 128 with network device(s) 122 and tap devices 124 and 126. Memory 130 may comprise program module(s) 138, rule(s) 140, and log(s) 142. Program module(s) 138 may comprise instructions that when executed by processor(s) 132 cause packet correlator 128, tap device 124, or tap device 126 to perform one or more of the functions described herein. Rule(s) 140 may be generated by packet correlator 128 and may be configured to cause tap device(s) 124 and 126 to identify packets meeting criteria specified by rule(s) 140 and to perform one or more functions specified by rule(s) 140 on the identified packets (e.g., forward (or route) the packets toward their respective destinations, drop the packets, log information associated with or contained in the packets, copy the packets (or data contained therein), or the like). For example, tap devices 124 and 126 may comprise one or more packet-filtering devices and may be provisioned with rule(s) 140, which may configure tap device(s) 124 and 126 to identify packets meeting criteria specified by rule(s) 140 and to communicate data associated with the identified packets to packet correlator 128 (e.g., via communication interface(s) 134), which may utilize the data to generate one or more log entries corresponding to the identified packets in log(s) 142.

Figure 2A:
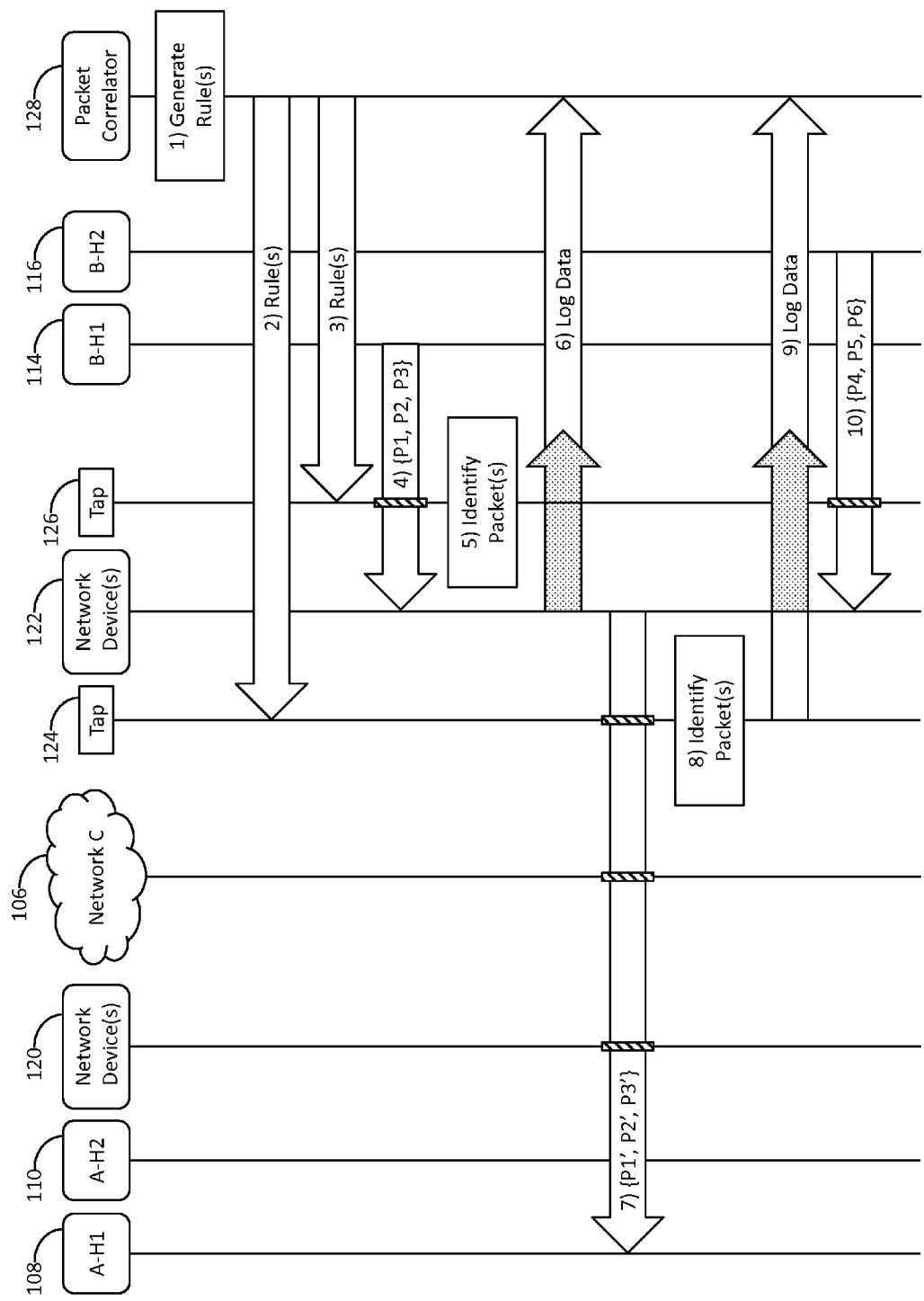

FIGS. 2A, 2B, 2C, and 2D depict an illustrative event sequence for correlating packets in communications networks in accordance with one or more aspects of the disclosure. Referring to FIG. 2A, at step 1, packet correlator 128 may generate rule(s) 140. As indicated above, rule(s) 140 may comprise criteria and may be configured to cause tap devices 124 and 126 to identify packets meeting the criteria and to perform one or more functions specified by rule(s) 140 on the identified packets. For example, rule(s) 140 may comprise criteria specifying a set of destination network addresses that includes an address associated with host 108 and may be configured to cause tap devices 124 and 126 to identify packets meeting the criteria (e.g., destined for host 108) and to communicate data associated with the identified packets to packet correlator 128. At step 2, packet correlator 128 may provision tap device 124 with rule(s) 140. At step 3, packet correlator 128 may provision tap device 126 with rule(s) 140.

At step 4, host 114 may generate packets (e.g., P1, P2, and P3) destined for host 108 and may communicate the packets to network device(s) 122. As indicated by the shaded box overlaying the communication of the packets and the line extending downward from tap device 126, the packets may be routed through tap device 126, or tap device 126 may have access to a communication path that interfaces network device(s) 122 and host 114 (e.g., tap device 126 may receive copies of or information associated with or contained in packets traversing the communication path that interfaces network device(s) 122 and host 114). At step 5, tap device 126 may identify the packets (e.g., P1, P2, and P3) by determining that the packets are destined for the network address associated with host 108 (e.g., based on network-layer information contained in their headers) and determining that the network address associated with host 108 is in the set of destination network addresses specified by the criteria included in rule(s) 140. At step 6, tap device 126 may generate log data associated with the packets received by network device(s) 122 from host 114 (e.g., P1, P2, and P3) and may communicate the log data to packet correlator 128. As indicated by the shaded communication emanating from network device(s) 122, the log data may include data from network device(s) 122, which may be requested (e.g., by tap device 126) and communicated via communication interface(s) 134.

Figure 3:
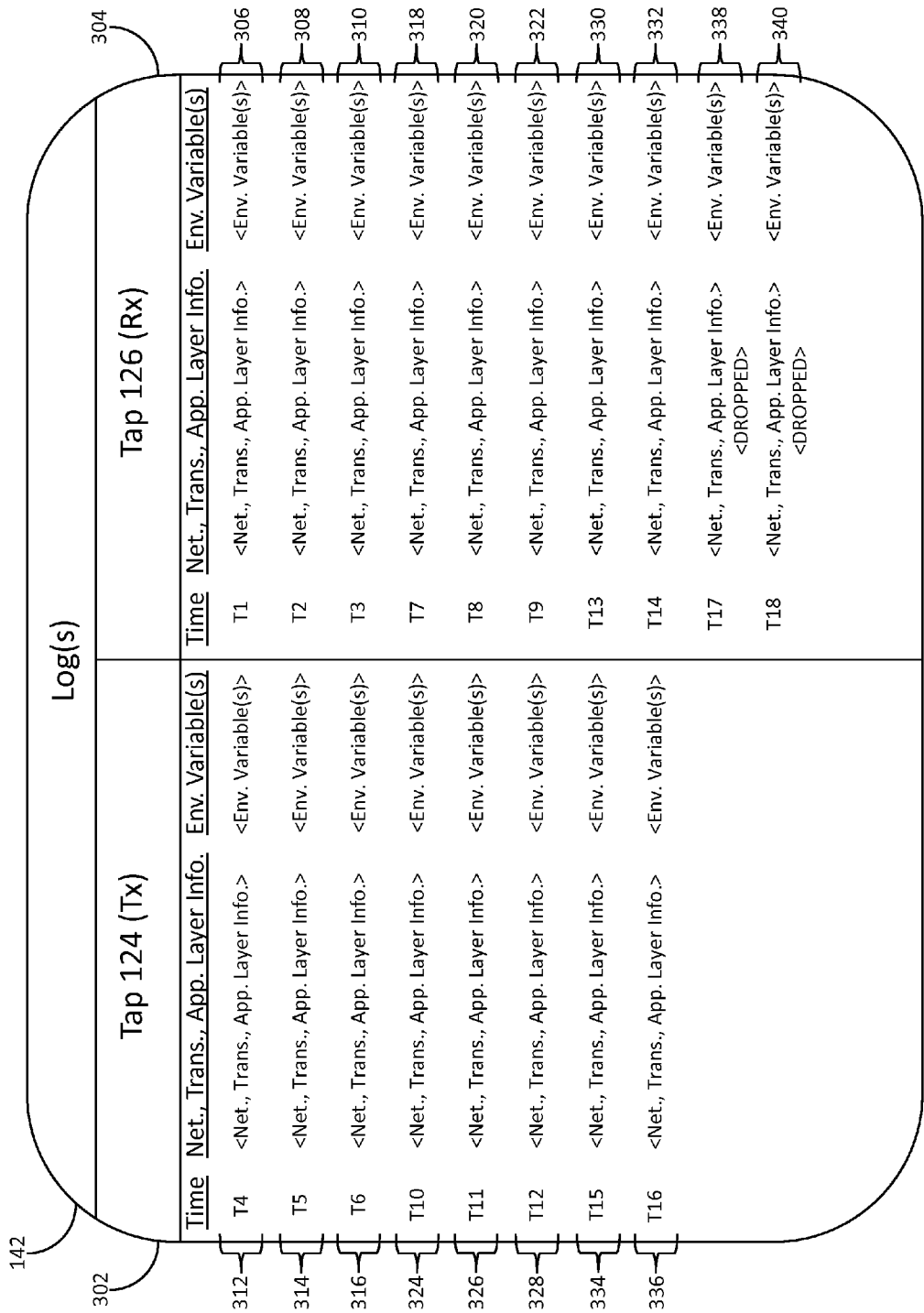
FIG. 3 depicts illustrative log entries for correlating packets in communications networks in accordance with one or more aspects of the disclosure.

Packet correlator 128 may receive the log data and may utilize the log data to generate one or more entries corresponding to the packets in log(s) 142. For example, referring to FIG. 3, log(s) 142 may include log(s) 302 (e.g., for entries associated with packets transmitted by network device(s) 122) and log(s) 304 (e.g., for entries associated with packets received by network device(s) 122), and, responsive to receiving the log data from tap device 126, packet correlator 128 may utilize the log data to generate entries 306, 308, and 310 (e.g., corresponding to P1, P2, and P3, respectively). Each of entries 306, 308, and 310 may include data associated with their respective corresponding packet, including, for example, network-layer information (e.g., information derived from one or more network-layer header fields of the packet, such as a protocol type, a destination network address, a source network address, a signature or authentication information (e.g., information from an Internet Protocol Security (IPsec) Encapsulating Security Payload (ESP)), or the like), transport-layer information (e.g., a destination port, a source port, a checksum or similar data (e.g., error detection or correction values, such as those utilized by the transmission control protocol (TCP) and the user datagram protocol (UDP)), or the like), application-layer information (e.g., information derived from one or more application-layer header fields of the packet, such as a domain name, a uniform resource locator (URL), a uniform resource identifier (URI), an extension, a method, state information, media-type information, a signature, a key, a timestamp, an application identifier, a session identifier, a flow identifier, sequence information, authentication information, or the like), other data in the packet (e.g., data in a payload of the packet), or one or more environmental variables (e.g., information associated with but not solely derived from the packet itself, such as an arrival time (e.g., at network device(s) 122 or tap device 126), an ingress or egress identifier of network device(s) 122 (e.g., an identifier associated with a physical or logical network interface or port of network device(s) 122 via which the packet was received), a communication-media type of network device(s) 122, an identifier associated with tap device 126, or the like). For example, entries 306, 308, and 310 may include data indicating that P1, P2, and P3 were received from host 114 and destined for host 108 (e.g., data derived from network- or application-layer header fields of P1, P2, and P3).

Packet correlator 128 may generate timestamps for each of entries 306, 308, and 310. For example, packet correlator 128 may generate a timestamp for entry 306 indicating a time (e.g., T1) corresponding to receipt of P1 by network device(s) 122 (e.g., a time corresponding to when network device(s) 122 received P1, a time corresponding to when tap device 126 identified P1, a time corresponding to generation of entry 306, or the like). Similarly, packet correlator 128 may generate a timestamp for entry 308 indicating a time (e.g., T2) corresponding to receipt of P2 by network device(s) 122 and generate a timestamp for entry 310 indicating a time (e.g., T3) corresponding to receipt of P3 by network device(s) 122.

Returning to FIG. 2A, at step 7, network device(s) 122 may generate one or more packets (e.g., P1', P2', and P3') corresponding to the packets received from host 114 and may communicate (or transmit) (e.g., via network 106 and network device(s) 120) the corresponding packets (or data contained therein) to host 108. The packets received by network device(s) 122 from host 114 (e.g., P1, P2, and P3) may be associated with one or more flows (e.g., distinct end-to-end communication sessions between host 114 and host 108), and the corresponding packets generated by network device(s) 122 and communicated to host 108 (e.g., P1', P2', and P3') may thus also be associated with the flow(s). Network device(s) 122, however, may include one or more devices that alter one or more aspects of the packets (e.g., a flow-transforming device) in a way that obfuscates the association of the packets received from host 114 (e.g., P1, P2, and P3) with the corresponding packets generated by network device(s) 122 (e.g., P1', P2', and P3'), at least from the perspective of devices other than network device(s) 122.

For example, in some embodiments, network device(s) 122 may be configured to perform network address translation (NAT) for network addresses associated with network 104 (e.g., network addresses associated with hosts 114, 116, and 118). In such embodiments, the packets received from host 114 (e.g., P1, P2, and P3) may comprise network- or transport-layer header information identifying their source as a network address associated with host 114 (e.g., a network address associated with network 104 (or a private network address)), and the corresponding packets generated by network device(s) 122 (e.g., P1', P2', and P3') may comprise network- or transport-layer header information identifying their source as a network address associated with network device(s) 122 (e.g., a network address associated with network 106 (or a public network address)).

Additionally or alternatively, network device(s) 122 may comprise a proxy (e.g., a web proxy, a domain name system (DNS) proxy, a session initiation protocol (SIP) proxy, or the like) configured to receive requests and generate corresponding requests. For example, the packets received by network device(s) 122 from host 114 (e.g., P1, P2, and P3) may comprise requests for data from host 108 configured to cause host 108 to transmit the requested data to host 114, and the corresponding packets generated by network device(s) 122 (e.g., P1', P2', and P3') may comprise corresponding requests for the data from host 108 configured to cause host 108 to transmit the requested data to network device(s) 122.

In some embodiments, network device(s) 122 may comprise a gateway (e.g., a bridge, intermediary, VPN, or tunneling gateway). For example, the packets received from host 114 (e.g., P1, P2, and P3) may comprise data destined for host 108, and the corresponding packets generated by network device(s) 122 (e.g., P1', P2', and P3') may comprise packets that encapsulate, encrypt, or otherwise transform the packets received from host 114 (e.g., P1, P2, and P3) (or the data destined for host 108 included therein). For example, network device(s) 122 may comprise a tunneling gateway, and network device(s) 120 may comprise a paired tunneling gateway configured to decapsulate, decrypt, or otherwise inverse transform P1', P2', and P3' (or data included therein) to produce, reproduce, or replicate P1, P2, and P3 (or the data destined for host 108 included therein). In such embodiments, there may not be a one-to-one correspondence between the packets received by network device(s) 122 and the corresponding packets generated by network device(s) 122. For example, data associated with the encapsulation may cause network device(s) 122 to generate more corresponding packets (e.g., due to one or more protocol size constraints).

While such obfuscation may be done without malice, it may also be performed with malicious intent. For example, network device(s) 122 may be employed by a malicious entity to attempt to obfuscate, spoof, or proxy for the identity or location of host 114 (e.g., network device(s) 122 may be employed as part of a man-in-the-middle attack).

At step 8, tap device 124 may identify the corresponding packets generated by network device(s) 122 (e.g., P1', P2', and P3') by determining that the packets meet the criteria included in rule(s) 140. The criteria may include any combination of the network-layer information, transport-layer information, application-layer information, or environmental variable(s), as described above with respect to FIG. 3. For example, tap device 124 may identify the corresponding packets generated by network device(s) 122 (e.g., P1', P2', and P3') by determining that the corresponding packets are destined for the network address associated with host 108 (e.g., based on network-layer information contained in their headers) and determining that the network address associated with host 108 is in the set of destination network addresses specified by the criteria included in rule(s) 140. At step 9, tap device 124 may generate log data associated with the corresponding packets generated by network device(s) 122 (e.g., P1', P2', and P3') and may communicate the log data to packet correlator 128. As indicated by the shaded communication emanating from network device(s) 122, the log data may include data from network device(s) 122, which may be requested (e.g., by tap device 124) and communicated via communication interface(s) 134.

Packet correlator 128 may receive the log data and may utilize the log data to generate one or more entries corresponding to the packets in log(s) 142. For example, responsive to receiving the log data from tap device 124, packet correlator 128 may utilize the log data to generate entries 312, 314, and 316 (e.g., corresponding to P1', P2', and P3', respectively) in log(s) 302. Each of entries 312, 314, and 316 may include data associated with their respective corresponding packet (e.g., network-layer information, transport-layer information, application-layer information, or environmental variable(s)). For example, entries 312, 314, and 316 may include data indicating that P1', P2', and P3' were destined for host 108 (e.g., data derived from application-layer header fields of P1', P2', and P3').

Packet correlator 128 may generate timestamps for each of entries 312, 314, and 316. For example, packet correlator 128 may generate a timestamp for entry 312 indicating a time (e.g., T4) corresponding to transmission of P1' by network device(s) 122 (e.g., a time corresponding to when network device(s) 122 transmitted P1', a time corresponding to when tap device 124 identified P1', a time corresponding to generation of entry 312, or the like). Similarly, packet correlator 128 may generate a timestamp for entry 314 indicating a time (e.g., T5) corresponding to transmission of P2' by network device(s) 122 and generate a timestamp for entry 316 indicating a time (e.g., T6) corresponding to transmission of P3' by network device(s) 122.

Figure 2B:
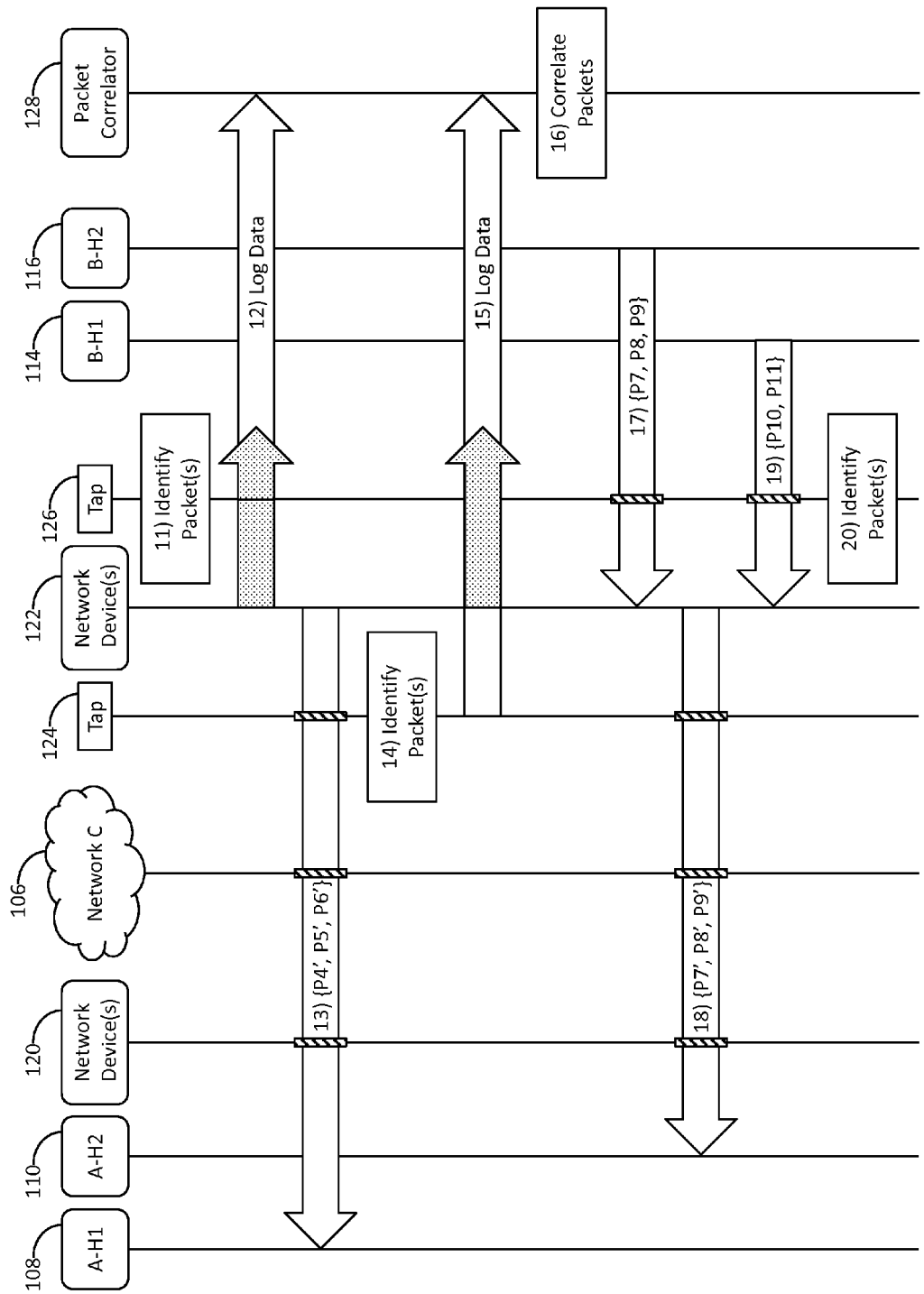

At step 10, host 116 may generate packets (e.g., P4, P5, and P6) destined for host 108 and may communicate the packets to network device(s) 122. Referring to FIG. 2B, at step 11, tap device 126 may identify the packets (e.g., P4, P5, and P6) by determining that the packets are destined for the network address associated with host 108 (e.g., based on network-layer information contained in their headers) and determining that the network address associated with host 108 is in the set of destination network addresses specified by the criteria included in rule(s) 140. At step 12, tap device 126 may generate log data associated with the packets received by network device(s) 122 from host 116 (e.g., P4, P5, and P6) and may communicate the log data to packet correlator 128.

Packet correlator 128 may receive the log data and may utilize the log data to generate one or more entries corresponding to the packets in log(s) 142. For example, responsive to receiving the log data from tap device 126, packet correlator 128 may utilize the log data to generate entries 318, 320, and 322 (e.g., corresponding to P4, P5, and P6, respectively) in log(s) 304. Each of entries 318, 320, and 322 may include data associated with their respective corresponding packet (e.g., network-layer information, transport-layer information, application-layer information, or environmental variable(s)). For example, entries 318, 320, and 322 may include data indicating that P4, P5, and P6 were received from host 116 and destined for host 108 (e.g., data derived from application-layer header fields of P4, P5, and P6).

Packet correlator 128 may generate timestamps for each of entries 318, 320, and 322. For example, packet correlator 128 may generate a timestamp for entry 318 indicating a time (e.g., T7) corresponding to receipt of P4 by network device(s) 122 (e.g., a time corresponding to when network device(s) 122 received P4, a time corresponding to when tap device 126 identified P4, a time corresponding to generation of entry 318, or the like). Similarly, packet correlator 128 may generate a timestamp for entry 320 indicating a time (e.g., T8) corresponding to receipt of P5 by network device(s) 122 and generate a timestamp for entry 322 indicating a time (e.g., T9) corresponding to receipt of P6 by network device(s) 122.

At step 13, network device(s) 122 may generate one or more packets (e.g., P4', P5', and P6') corresponding to the packets received from host 116 and may communicate (or transmit) (e.g., via network 106 and network device(s) 120) the corresponding packets (or data contained therein) to host 108. The packets received by network device(s) 122 from host 116 (e.g., P4, P5, and P6) may be associated with one or more flows (e.g., distinct end-to-end communication sessions between host 116 and host 108), and the corresponding packets generated by network device(s) 122 and communicated to host 108 (e.g., P4', P5', and P6') may thus also be associated with the flow(s). As indicated above, however, network device(s) 122 may include one or more devices that alter one or more aspects of the packets (e.g., a device configured to perform NAT for network addresses associated with network 104, a proxy, a gateway (e.g., a VPN or tunneling gateway), or one or more other flow-transforming devices) in a way that obfuscates the association of the packets received from host 116 (e.g., P4, P5, and P6) with the corresponding packets generated by network device(s) 122 (e.g., P4', P5', and P6'), at least from the perspective of devices other than network device(s) 122.

For example, as indicated above, network device(s) 122 may be configured to perform NAT for network addresses associated with network 104. The packets received from host 116 (e.g., P4, P5, and P6) may comprise network- or transport-layer header information identifying their source as a network address associated with host 116 (e.g., a network address associated with network 104 (or a private network address)), and the corresponding packets generated by network device(s) 122 (e.g., P4', P5', and P6') may comprise network- or transport-layer header information identifying their source as a network address associated with network device(s) 122 (e.g., a network address associated with network 106 (or a public network address)).

At step 14, tap device 124 may identify the corresponding packets generated by network device(s) 122 (e.g., P4', P5', and P6') by determining that the packets meet the criteria included in rule(s) 140. For example, tap device 124 may identify the corresponding packets generated by network device(s) 122 (e.g., P4', P5', and P6') by determining that the corresponding packets are destined for the network address associated with host 108 (e.g., based on network- or transport-layer information contained in their headers) and determining that the network address associated with host 108 is in the set of destination network addresses specified by the criteria included in rule(s) 140. At step 15, tap device 124 may generate log data associated with the corresponding packets generated by network device(s) 122 (e.g., P4', P5', and P6') and may communicate the log data to packet correlator 128.

Packet correlator 128 may receive the log data and may utilize the log data to generate one or more entries corresponding to the packets in log(s) 142. For example, responsive to receiving the log data from tap device 124, packet correlator 128 may utilize the log data to generate entries 324, 326, and 328 (e.g., corresponding to P4', P5', and P6', respectively) in log(s) 302. Each of entries 324, 326, and 328 may include data associated with their respective corresponding packet (e.g., network-layer information, transport-layer information, application-layer information, or environmental variable(s)). For example, entries 324, 326, and 328 may include data indicating that P4', P5', and P6' were destined for host 108 (e.g., data derived from application-layer header fields of P4', P5', and P6').

Packet correlator 128 may generate timestamps for each of entries 324, 326, and 328. For example, packet correlator 128 may generate a timestamp for entry 324 indicating a time (e.g., T10) corresponding to transmission of P4' by network device(s) 122 (e.g., a time corresponding to when network device(s) 122 transmitted P4', a time corresponding to when tap device 124 identified P4', a time corresponding to generation of entry 324, or the like). Similarly, packet correlator 128 may generate a timestamp for entry 326 indicating a time (e.g., T11) corresponding to transmission of P5' by network device(s) 122 and generate a timestamp for entry 328 indicating a time (e.g., T12) corresponding to transmission of P6' by network device(s) 122.

At step 16, packet correlator 128 may utilize log(s) 142 to correlate the packets transmitted by network device(s) 122 with the packets received by network device(s) 122. For example, packet correlator 128 may compare data in entry 306 with data in entry 312 (e.g., network-layer information, transport-layer information, application-layer information, or environmental variable(s)) to correlate P1' with P1 (e.g., by determining that a portion of the data in entry 306 corresponds with data in entry 312). Similarly, packet correlator 128 may compare data in entry 308 with data in entry 314 to correlate P2' with P2, packet correlator 128 may compare data in entry 310 with data in entry 316 to correlate P3' with P3, packet correlator 128 may compare data in entry 318 with data in entry 324 to correlate P4' with P4, packet correlator 128 may compare data in entry 320 with data in entry 326 to correlate P5' with P5, and packet correlator 128 may compare data in entry 322 with data in entry 328 to correlate P6' with P6.

In some embodiments, packet correlator 128 may compare data in one or more entries of log(s) 142 with data in one or more other entries of log(s) 142 to determine correlation scores for each of multiple possible correlations. For example, for each entry in log(s) 302 (or a portion thereof (e.g., a portion of the entries comprising data matching one or more criteria)), packet correlator 128 may compare data in the entry with data in each of the entries in log(s) 304 (or a portion thereof (e.g., a portion of the entries comprising data matching the one or more criteria)) to determine correlation scores corresponding to multiple possible correlations (e.g., based on the amount (e.g., percentage) of information in the data that corresponds) and may select the correlation corresponding to the correlation score indicating the strongest correlation (e.g., indicating the greatest amount of corresponding information in the data of the entries). For example, for entry 312, packet correlator 128 may compare the data in entry 312 (e.g., network-layer information, transport-layer information, application-layer information, or environmental variable(s)) (or a portion thereof) with the data in entries 306, 308, and 310 (or corresponding portions thereof), may determine that the amount (e.g., percentage) of data in entry 312 that corresponds to data in entry 306 is greater than the amount of data in entry 312 that corresponds to data in entry 308 and the amount of data in entry 312 that corresponds to data in entry 310, and, based on such a determination, may correlate P1' with P1.

In some embodiments, packet correlator 128 may correlate the packets transmitted by network device(s) 122 with the packets received by network device(s) 122 by comparing one or more timestamps of the entries in log(s) 142 with one or more other timestamps of the entries in log(s) 142. For example, for each entry in log(s) 302 (or a portion thereof (e.g., a portion of the entries comprising data matching one or more criteria)), packet correlator 128 may compare the timestamp of the entry with the timestamps of the entries in log(s) 304 (or a portion thereof (e.g., a portion of the entries comprising data matching the one or more criteria)) to determine a difference between the times indicated by the timestamps and may correlate the packet corresponding to the entry in log(s) 302 with a packet corresponding to an entry in log(s) 304 having the smallest difference in time indicated by the timestamps. For example, for entry 312, packet correlator 128 may compute a difference between T4 and T1, T2, and T3, may determine that |T4−T1|<|T4−T2|<|T4−T3|, and, based on such a determination, may correlate P1' with P1.

At step 17, host 116 may generate packets (e.g., P7, P8, and P9) destined for host 110 and may communicate the packets to network device(s) 122. Tap device 126 may determine that the packets (e.g., P7, P8, and P9) are destined for a network address associated with host 110 (e.g., based on network-layer information contained in their headers), may determine that the network address associated with host 110 is not in the set of destination network addresses specified by the criteria included in rule(s) 140, and, based on these determinations, may fail to generate log data associated with the packets received by network device(s) 122 from host 116 (e.g., P7, P8, and P9). At step 18, network device(s) 122 may generate one or more packets (e.g., P7', P8', and P9') corresponding to the packets received from host 116 and may communicate (or transmit) (e.g., via network 106 and network device(s) 120) the corresponding packets (or data contained therein) to host 110. Tap device 124 may determine that the corresponding packets (e.g., P7', P8', and P9') are destined for the network address associated with host 110 (e.g., based on network-layer information contained in their headers), may determine that the network address associated with host 110 is not in the set of destination network addresses specified by the criteria included in rule(s) 140, and, based on these determinations, may fail to generate log data associated with the packets generated by network device(s) 122 (e.g., P7', P8', and P9'). For example, packet correlator 128 may be configured to correlate packets destined for the network address associated with host 108 but not packets destined for the network address associated with host 110, and rule(s) 140 may be configured to cause tap devices 124 and 126 to generate log data for packets destined for the network address associated with host 108 but not for packets destined for the network address associated with host 110 (e.g., host 108 may be associated with a malicious entity or host 110 may be associated with a trusted entity).

Figure 2C:
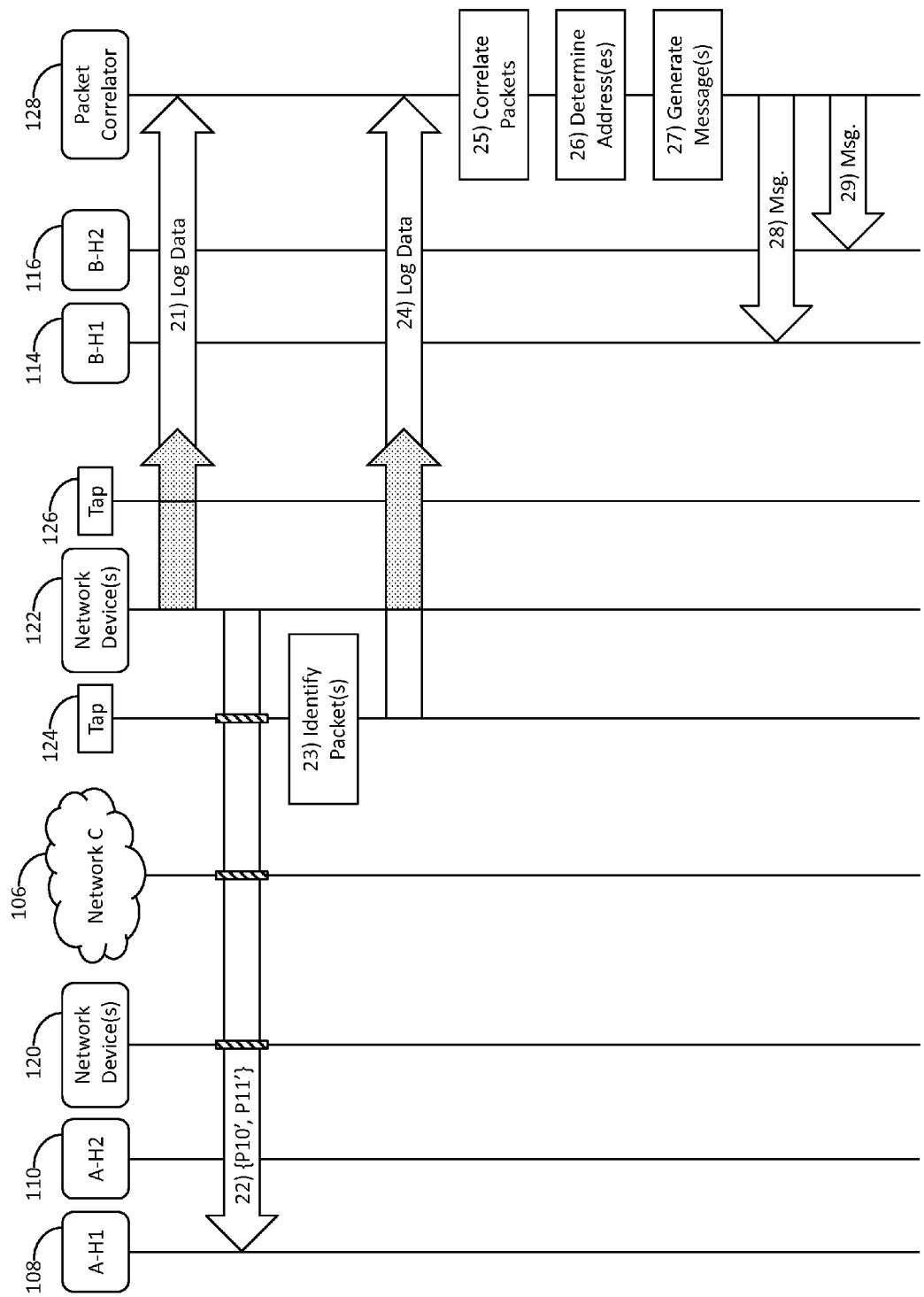

At step 19, host 114 may generate packets (e.g., P10 and P11) destined for host 108 and may communicate the packets to network device(s) 122. At step 20, tap device 126 may identify the packets (e.g., P10 and P11) by determining that the packets are destined for the network address associated with host 108 (e.g., based on network-layer information contained in their headers) and determining that the network address associated with host 108 is in the set of destination network addresses specified by the criteria included in rule(s) 140. Referring to FIG. 2C, at step 21, tap device 126 may generate log data associated with the packets received by network device(s) 122 from host 114 (e.g., P10 and P11) and may communicate the log data to packet correlator 128.

Packet correlator 128 may receive the log data and may utilize the log data to generate one or more entries corresponding to the packets in log(s) 142. For example, responsive to receiving the log data from tap device 126, packet correlator 128 may utilize the log data to generate entries 330 and 332 (e.g., corresponding to P10 and P11, respectively) in log(s) 304. Each of entries 330 and 332 may include data associated with their respective corresponding packet (e.g., network-layer information, transport-layer information, application-layer information, or environmental variable(s)). For example, entries 330 and 332 may include data indicating that P10 and P11 were received from host 114 and destined for host 108 (e.g., data derived from application-layer header fields of P10 and P11).

Packet correlator 128 may generate timestamps for each of entries 330 and 332. For example, packet correlator 128 may generate a timestamp for entry 330 indicating a time (e.g., T13) corresponding to receipt of P10 by network device(s) 122 (e.g., a time corresponding to when network device(s) 122 received P10, a time corresponding to when tap device 126 identified P10, a time corresponding to generation of entry 330, or the like). Similarly, packet correlator 128 may generate a timestamp for entry 332 indicating a time (e.g., T14) corresponding to receipt of P11 by network device(s) 122.

At step 22, network device(s) 122 may generate one or more packets (e.g., P10' and P11') corresponding to the packets received from host 114 and may communicate (or transmit) (e.g., via network 106 and network device(s) 120) the corresponding packets (or data contained therein) to host 108. The packets received by network device(s) 122 from host 114 (e.g., P10 and P11) may be associated with one or more flows (e.g., distinct end-to-end communication sessions between host 114 and host 108), and the corresponding packets generated by network device(s) 122 and communicated to host 108 (e.g., P10' and P11') may thus also be associated with the flow(s). As indicated above, however, network device(s) 122 may include one or more devices that alter one or more aspects of the packets (e.g., a device configured to perform NAT for network addresses associated with network 104, a proxy, a gateway (e.g., a VPN or tunneling gateway), or one or more other flow-transforming devices) in a way that obfuscates the association of the packets received from host 114 (e.g., P10 and P11) with the corresponding packets generated by network device(s) 122 (e.g., P10' and P11'), at least from the perspective of devices other than network device(s) 122.

For example, as indicated above, network device(s) 122 may be configured to perform NAT for network addresses associated with network 104. The packets received from host 114 (e.g., P10 and P11) may comprise network-layer header information identifying their source as a network address associated with host 114 (e.g., a network address associated with network 104 (or a private network address)), and the corresponding packets generated by network device(s) 122 (e.g., P10' and P11') may comprise network-layer header information identifying their source as a network address associated with network device(s) 122 (e.g., a network address associated with network 106 (or a public network address)).

At step 23, tap device 124 may identify the corresponding packets generated by network device(s) 122 (e.g., P10' and P11') by determining that the packets meet the criteria included in rule(s) 140. For example, tap device 124 may identify the corresponding packets generated by network device(s) 122 (e.g., P10' and P11') by determining that the corresponding packets are destined for the network address associated with host 108 (e.g., based on network-layer information contained in their headers) and determining that the network address associated with host 108 is in the set of destination network addresses specified by the criteria included in rule(s) 140. At step 24, tap device 124 may generate log data associated with the corresponding packets generated by network device(s) 122 (e.g., P10' and P11') and may communicate the log data to packet correlator 128.

Packet correlator 128 may receive the log data and may utilize the log data to generate one or more entries corresponding to the packets in log(s) 142. For example, responsive to receiving the log data from tap device 124, packet correlator 128 may utilize the log data to generate entries 334 and 336 (e.g., corresponding to P10' and P11', respectively) in log(s) 302. Each of entries 334 and 336 may include data associated with their respective corresponding packet (e.g., network-layer information, transport-layer information, application-layer information, or environmental variable(s)). For example, entries 334 and 336 may include data indicating that P10' and P11' were destined for host 108 (e.g., data derived from application-layer header fields of P10' and P11').

Packet correlator 128 may generate timestamps for each of entries 334 and 336. For example, packet correlator 128 may generate a timestamp for entry 334 indicating a time (e.g., T15) corresponding to transmission of P10' by network device(s) 122 (e.g., a time corresponding to when network device(s) 122 transmitted P10', a time corresponding to when tap device 124 identified P10', a time corresponding to generation of entry 334, or the like). Similarly, packet correlator 128 may generate a timestamp for entry 336 indicating a time (e.g., T16) corresponding to transmission of P11' by network device(s) 122.

At step 25, packet correlator 128 may utilize log(s) 142 to correlate the packets transmitted by network device(s) 122 with the packets received by network device(s) 122. For example, packet correlator 128 may compare data in entry 330 with data in entry 334 (e.g., network-layer information, transport-layer information, application-layer information, or environmental variable(s)) to correlate P10' with P10 (e.g., by determining that a portion of the data in entry 330 corresponds with data in entry 334). Similarly, packet correlator 128 may compare data in entry 332 with data in entry 336 to correlate P11' with P11. In some embodiments, packet correlator 128 may compare data from one or more requests included in the packets transmitted by network device(s) 122 with data from one or more requests included in the packets received by network device(s) 122 and may correlate one or more of the packets transmitted by network device(s) 122 with one or more of the packets received by network device(s) 122 by determining that the data from the request(s) included in the packet(s) transmitted by network device(s) 122 corresponds to the data from the request(s) included in the packet(s) received by network device(s) 122 (e.g., where network device(s) 122 include a proxy). Additionally or alternatively, packet correlator 128 may compare data encapsulated in one or more of the packets transmitted by network device(s) 122 with data from one or more of the packets received by network device(s) 122 and may correlate one or more of the packets transmitted by network device(s) 122 with one or more of the packets received by network device(s) 122 by determining that the data encapsulated in the packet(s) transmitted by network device(s) 122 corresponds to the data in the packet(s) received by network device(s) 122 (e.g., where network device(s) 122 include a gateway (e.g., a VPN or tunneling gateway)).

In some embodiments, packet correlator 128 may correlate the packets transmitted by network device(s) 122 with the packets received by network device(s) 122 by comparing one or more timestamps of the entries in log(s) 142 with one or more other timestamps of the entries in log(s) 142. For example, packet correlator 128 may compare the timestamp of an entry in log(s) 302 with the timestamps of one or more entries in log(s) 304 (e.g., a portion of the entries comprising data matching one or more criteria)) to determine a difference between the times indicated by the timestamps and may compare the difference between the times indicated by the timestamps with a threshold latency value associated with network device(s) 122 (e.g., a predetermined value representing the time it takes for a packet to be communicated from tap device 126 to tap device 124, an estimated maximum latency associated with a communication path spanning from tap device 126 to tap device 124 (e.g., a communication path comprising network device(s) 122), or the like). For example, for entry 334, packet correlator 128 may compute a difference between T15 and T13, may determine that 0<T15−T13<THRESHOLD, and, based on such a determination, may correlate P10' with P10. In some embodiments, the threshold latency value may be determined based on one or more previously determined differences between timestamps of entries corresponding to previously correlated packets. For example, the threshold latency value with which the difference between T15 and T13 is compared may have been determined based on the differences between T4 and T1, T5 and T2, or T6 and T3.

Responsive to correlating the packets transmitted by network device(s) 122 with the packets received by network device(s) 122, at step 26, packet correlator 128 may determine, based on one or more of the entries in log(s) 142, a network address associated with a host located in network 104 that is associated with a packet transmitted by network device(s) 122. For example, responsive to correlating P10' with P10, packet correlator 128 may determine, based on data in entry 330 (e.g., network-layer information comprising the network address associated with host 114) that the network address associated with host 114 is associated with P10' (e.g., a communication with host 108). At step 27, packet correlator 128 may generate one or more messages identifying host 114. For example, host 108 may be associated with a malicious entity, packet correlator 128 may determine (e.g., based on network-layer information in entry 334) that P10' was transmitted to host 108, and the message(s) may indicate that host 114 communicated with host 108 (e.g., the malicious entity). At step 28, packet correlator 128 may communicate one or more of the message(s) to host 114 (e.g., to notify a user of host 114 of the communication with the malicious entity), and, at step 29, packet correlator 128 may communicate one or more of the message(s) to host 116, which may be associated with an administrator of network 104 (e.g., to notify the administrator of the communication of host 114 with the malicious entity).

Referring to FIG. 2D, at step 30, packet correlator 128 may generate or update rule(s) 140 (e.g., generate one or more new rules or update one or more existing rules) to configure tap devices 124 and 126 to identify and drop packets received from host 114. At step 31, packet correlator 128 may provision tap device 124 with rule(s) 140, and, at step 32, packet correlator 128 may provision tap device 126 with rule(s) 140. At step 33, host 114 may communicate one or more packets (e.g., P12, which may be destined for host 112, and P13, which may be destined for host 118). At step 34, tap device 126 may identify and drop the packets (e.g., P12 and P13) communicated by host 114 (e.g., based on rule(s) 140 and network-layer information contained in the headers of P12 and P13). For example, one or more of the communications between host 108 and 114 (e.g., P1 and P1', P2 and P2', P3 and P3', P10 and P10', or P11 and P11') may be indicative of malware installed by a computing device associated with host 108 (e.g., the malicious entity) on a computing device associated with host 114, and rule(s) 140 may be configured to prevent the spread of the malware.

At step 35, tap device 126 may generate log data associated with the packets communicated by host 114 (e.g., P12 and P13) and may communicate the log data to packet correlator 128, which may receive the log data and may utilize the log data to generate one or more entries corresponding to the packets in log(s) 142. For example, responsive to receiving the log data from tap device 126, packet correlator 128 may utilize the log data to generate entries 338 and 340 (e.g., corresponding to P12 and P13, respectively) in log(s) 304. Each of entries 338 and 340 may include data associated with their respective corresponding packet (e.g., network-layer information, transport-layer information, application-layer information, or environmental variable(s)). For example, entry 338 may include data indicating that P12 was received from host 114 and destined for host 112 (e.g., data derived from application-layer header fields of P12), and entry 340 may include data indicating that P13 was received from host 114 and destined for host 118 (e.g., data derived from application-layer header fields of P13). Entries 338 and 340 may indicate that tap device 126 dropped their respective corresponding packets. Packet correlator 128 may generate timestamps for each of entries 338 and 340. For example, packet correlator 128 may generate a timestamp for entry 338 indicating a time (e.g., T17) corresponding to when tap device 126 identified P12, generation of entry 338, or the like. Similarly, packet correlator 128 may generate a timestamp for entry 340 indicating a time (e.g., T18) corresponding to when tap device 126 identified P13, generation of entry 340, or the like.

Figure 4:
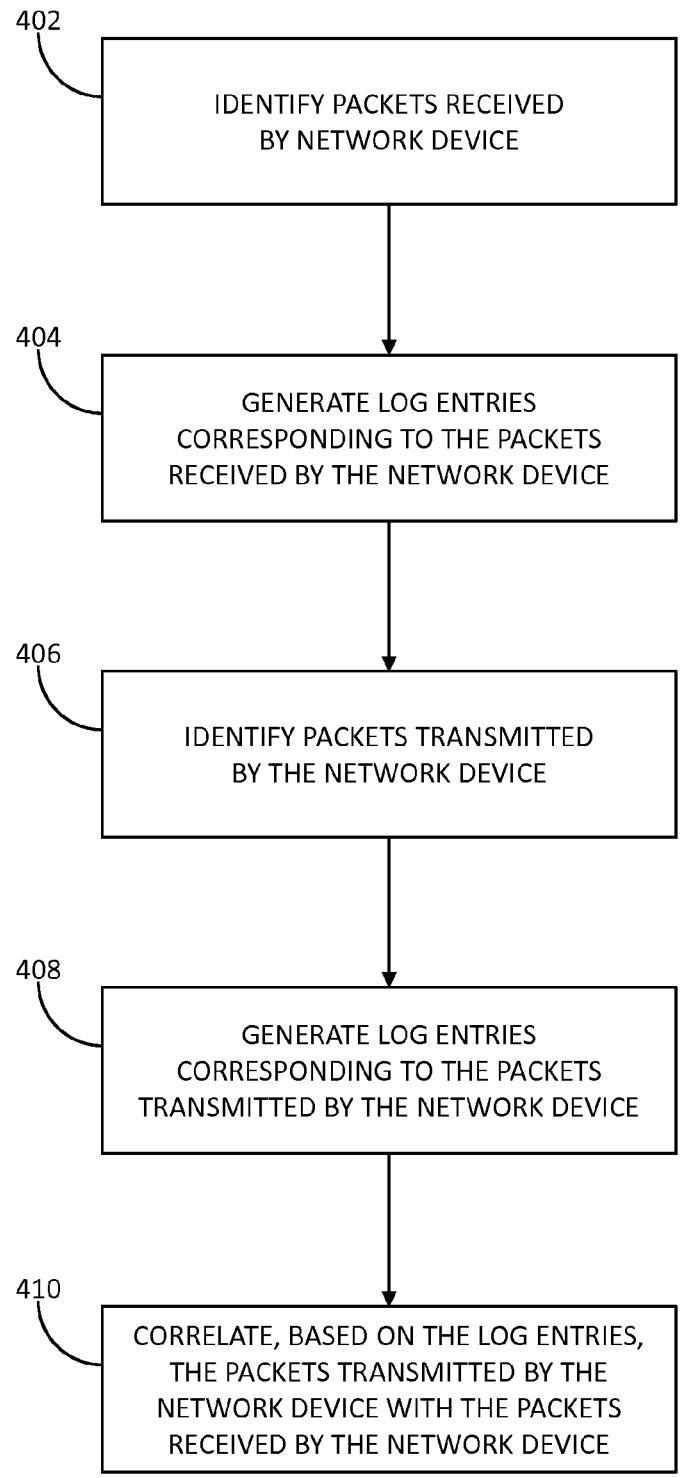
FIG. 4 depicts an illustrative method for correlating packets in communications networks in accordance with one or more aspects of the disclosure.

FIG. 4 depicts an illustrative method for correlating packets in communications networks in accordance with one or more aspects of the disclosure. Referring to FIG. 4, at step 402, a computing system may identify packets received by a network device from a host located in a first network. For example, tap device 126 may identify P1, P2, and P3. At step 404, the computing system may generate log entries corresponding to the packets received by the network device. For example, packet correlator 128 may generate entries 306, 308, and 310. At step 406, the computing system may identify packets transmitted by the network device to a host located in a second network. For example, tap device 124 may identify P1', P2', and P3'. At step 408, the computing system may generate log entries corresponding to the packets transmitted by the network device. For example, packet correlator 128 may generate entries 312, 314, and 316. At step 410, the computing system may correlate, based on the log entries corresponding to the packets received by the network device and the log entries corresponding to the packets transmitted by the network device, the packets transmitted by the network device with the packets received by the network device. For example, packet correlator 128 may correlate, based on entries 306, 308, 310, 312, 314, and 316, P1' with P1, P2' with P2, and P3' with P3.

In some embodiments, the packets received by the network device may be associated with one or more flows (e.g., distinct end-to-end communication sessions); however, the network device may alter the packets in a way that obscures their association with the flow(s) from the computing system. For example, P1, P2, and P3 may be associated with a common flow; however, network device(s) 122 may alter P1, P2, and P3 (e.g., by generating P1', P2', and P3') in a way that obscures their association with the common flow from packet correlator 128. Correlating the packets transmitted by the network device with the packets received by the network device may enable the computing system to determine that the packets transmitted by the network device are associated with the flow(s). For example, correlating P1' with P1, P2' with P2, and P3' with P3 may enable packet correlator 128 to determine that P1', P2', and P3' are associated with the common flow.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data-processing device. The computer-executable instructions may be stored on a computer-readable medium such as a hard disk, optical disk, removable storage media, solid-state memory, RAM, etc. As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Particular data structures may be used to more effectively implement one or more aspects of the disclosure, and such data structures are contemplated to be within the scope of computer-executable instructions and computer-usable data described herein.

Although not required, one of ordinary skill in the art will appreciate that various aspects described herein may be embodied as a method, system, apparatus, or one or more computer-readable media storing computer-executable instructions. Accordingly, aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and networks. The functionality may be distributed in any manner or may be located in a single computing device (e.g., a server, client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Any and all features in the following claims may be combined or rearranged in any way possible.

What is claimed is:

1. A method comprising:
    provisioning, by a computing system, a first tap with one or more rules configured to identify a plurality of packets received by a network device from a host located in a first network, wherein a communication path that interfaces the network device and the first network comprises the first tap;
    provisioning, by the computing system, a second tap with one or more rules configured to identify a plurality of packets transmitted by the network device to a host located in a second network, wherein a communication path that interfaces the network device and the second network comprises the second tap;

provisioning, by the computing system, the first tap and the second tap with one or more rules specifying a set of network addresses and configured to cause the computing system to log packets destined for one or more network addresses in the set of network addresses;

identifying, by the computing system, the plurality of packets received by the network device;

generating, by the computing system, a plurality of log entries corresponding to the plurality of packets received by the network device;

identifying, by the computing system, the plurality of packets transmitted by the network device;

generating, by the computing system, a plurality of log entries corresponding to the plurality of packets transmitted by the network device;

correlating, by the computing system and based on the plurality of log entries corresponding to the plurality of packets received by the network device and the plurality of log entries corresponding to the plurality of packets transmitted by the network device, the plurality of packets transmitted by the network device with the plurality of packets received by the network device; and responsive to correlating the plurality of packets transmitted by the network device with the plurality of packets received by the network device:

generating, by the computing system, data identifying the host located in the first network; and communicating, by the computing system and to a device located in the first network, the data identifying the host located in the first network.

2. The method of claim 1, comprising:

determining, by the first tap, that the plurality of packets received by the network device are destined for a network address associated with the host located in the second network;

determining, by the first tap, that the network address associated with the host located in the second network is in the set of network addresses;

determining, by the second tap, that the plurality of packets transmitted by the network device are destined for the network address associated with the host located in the second network; and determining, by the second tap, that the network address associated with the host located in the second network is in the set of network addresses.

3. The method of claim 2, comprising:

generating, by the computing system, a plurality of log entries comprising data indicating that the plurality of packets received by the network device are destined for the network address associated with the host located in the second network; and generating, by the computing system, a plurality of log entries comprising data indicating that the plurality of packets transmitted by the network device are destined for the network address associated with the host located in the second network.

4. The method of claim 3, comprising correlating, by the computing system, each log entry of the plurality of log entries comprising the data indicating that the plurality of packets transmitted by the network device are destined for the network address associated with the host located in the second network with one or more log entries of the plurality of log entries comprising the data indicating that the plurality of packets received by the network device are destined for the network address associated with the host located in the second network.

5. The method of claim 3, comprising generating, by the computing system, a plurality of log entries comprising data indicating that a portion of the plurality of packets received by the network device were received from a network address associated with the host located in the first network.

6. The method of claim 5, wherein generating the data identifying the host located in the first network comprises generating data comprising the network address associated with the host located in the first network.

7. The method of claim 5, wherein the network device is configured to perform network address translation (NAT) for a plurality of network addresses associated with the first network, wherein the plurality of network addresses associated with the first network comprises the network address associated with the host located in the first network and a network address associated with a different host located in the first network, the method comprising generating, by the computing system, a plurality of log entries comprising data indicating that a portion of the plurality of packets received by the network device were received from the network address associated with the different host located in the first network.

8. The method of claim 7, comprising:

correlating, by the computing system, a first portion of the plurality of log entries comprising the data indicating that the plurality of packets transmitted by the network device are destined for the network address associated with the host located in the second network with the plurality of log entries comprising the data indicating that the portion of the plurality of packets received by the network device were received from the network address associated with the host located in the first network; and correlating, by the computing system, a second portion of the plurality of log entries comprising the data indicating that the plurality of packets transmitted by the network device are destined for the network address associated with the host located in the second network with the plurality of log entries comprising the data indicating that the portion of the plurality of packets received by the network device were received from the network address associated with the different host located in the first network.

9. The method of claim 1, wherein correlating the plurality of packets transmitted by the network device with the plurality of packets received by the network device comprises comparing one or more ports indicated by the plurality of log entries corresponding to the plurality of packets received by the network device with one or more ports indicated by the plurality of log entries corresponding to the plurality of packets transmitted by the network device.

10. The method of claim 1, wherein correlating the plurality of packets transmitted by the network device with the plurality of packets received by the network device comprises correlating one or more protocol types indicated by the plurality of log entries corresponding to the plurality of packets received by the network device with one or more protocol types indicated by the plurality of log entries corresponding to the plurality of packets transmitted by the network device.

11. The method of claim 1, wherein correlating the plurality of packets transmitted by the network device with the plurality of packets received by the network device comprises comparing application-layer data indicated by the plurality of log entries corresponding to the plurality of packets received by the network device with application-layer data indicated by the plurality of log entries corresponding to the plurality of packets transmitted by the network device.

12. The method of claim 1, wherein correlating the plurality of packets transmitted by the network device with the plurality of packets received by the network device comprises comparing one or more network-interface identifiers of the network device indicated by the plurality of log entries corresponding to the plurality of packets received by the network device with one or more network-interface identifiers of the network device indicated by the plurality of log entries corresponding to the plurality of packets transmitted by the network device.

13. The method of claim 1, wherein correlating the plurality of packets transmitted by the network device with the plurality of packets received by the network device comprises comparing one or more times indicated by the plurality of log entries corresponding to the plurality of packets received by the network device with one or more times indicated by the plurality of log entries corresponding to the plurality of packets transmitted by the network device.

14. The method of claim 13, wherein:
generating the plurality of log entries corresponding to the plurality of packets received by the network device comprises generating a plurality of timestamps indicating times corresponding to receipt, by the network device, of the plurality of packets received by the network device; and
generating the plurality of log entries corresponding to the plurality of packets transmitted by the network device comprises generating a plurality of timestamps indicating times corresponding to transmission, by the network device, of the plurality of packets transmitted by the network device.

15. The method of claim 14, comprising determining, by the computing system and for each timestamp of the plurality of timestamps indicating the times corresponding to transmission of the plurality of packets transmitted by the network device, that a difference between a time indicated by the timestamp and a time indicated by a timestamp of the plurality of timestamps indicating the times corresponding to receipt of the plurality of packets received by the network device is less than a threshold latency value for the network device.

16. The method of claim 14, comprising:
determining, by the computing system, a plurality of latency values for the network device, wherein determining the plurality of latency values comprises determining, for each timestamp of a first portion of the plurality of timestamps indicating the times corresponding to transmission of the plurality of packets transmitted by the network device a difference between a time indicated by the timestamp and a time indicated by a timestamp of the plurality of timestamps indicating the times corresponding to receipt of the plurality of packets received by the network device;
determining, by the computing system and based on the plurality of latency values, an updated threshold latency value for the network device; and
determining, by the computing system and for each timestamp of a second portion of the plurality of timestamps indicating the times corresponding to transmission of the plurality of packets transmitted by the network device that a difference between a time indicated by the timestamp and a time indicated by a timestamp of the plurality of timestamps indicating the times corresponding to receipt of the plurality of packets received by the network device is less than the updated threshold latency value for the network device.

17. The method of claim 1, wherein:
the network device comprises a proxy configured to:
receive requests, for data from the host located in the second network, transmitted by the host located in the first network; and
generate requests corresponding to the requests transmitted by the host located in the first network and configured to cause the host located in the second network to transmit, to the network device, the data from the host located in the second network; and
correlating the plurality of packets transmitted by the network device with the plurality of packets received by the network device comprises comparing data from the requests transmitted by the host located in the first network with data from the requests corresponding to the requests transmitted by the host located in the first network.

18. The method of claim 1, wherein:
the network device comprises a gateway configured to:
receive, from the host located in the first network, data destined for the host located in the second network; and
generate one or more packets, destined for the host located in the second network, encapsulating the data destined for the host located in the second network; and
correlating the plurality of packets transmitted by the network device with the plurality of packets received by the network device comprises comparing at least a portion of the data destined for the host located in the second network with data from the one or more packets encapsulating the data destined for the host located in the second network.

19. The method of claim 1, wherein the host located in the second network is associated with a malicious entity, the method comprising generating, by the computing system, data configured to cause the first network to drop packets transmitted by the host located in the first network.

20. The method of claim 1, wherein the communication path that interfaces the network device and the first network comprises a packet-filtering device, the method comprising:
generating, by the computing system, one or more rules configured to identify packets received from the host located in the first network;
provisioning, by the computing system, the packet-filtering device with the one or more rules configured to identify packets received from the host located in the first network;
identifying, by the packet-filtering device and based on the one or more rules configured to identify packets received from the host located in the first network, at least one packet received from the host located in the first network; and
responsive to identifying the at least one packet received from the host located in the first network, dropping, by the packet-filtering device, the at least one packet received from the host located in the first network.

21. The method of claim 1, comprising:
generating, by the computing system, a message identifying the host located in the first network; and
communicating, by the computing system and to at least one of the host located in the first network or a computing device associated with an administrator of the first network, the message identifying the host located in the first network.

22. A system comprising:
at least one processor; and
a memory storing instructions that when executed by the at least one processor cause the system to:
provision a device in a communication link interfacing a network device and a first network with one or more rules configured to identify a plurality of packets received by the network device from a host located in the first network;
provision a device in a communication link interfacing the network device and a second network with one or more rules configured to identify a plurality of packets transmitted by the network device to a host located in a second network;
provision the device in the communication link interfacing the network device and the first network and the device in the communication link interfacing the network device and the second network with one or more rules specifying a set of network addresses and configured to cause the system to log packets destined for one or more network addresses in the set of network addresses;
configure the device in the communication link interfacing the network device with the first network to:
identify the plurality of packets received by the network device;
generate a plurality of log entries corresponding to the plurality of packets received by the network device; and
communicate, to the system, the plurality of log entries corresponding to the plurality of packets received by the network device;
configure the device in the communication link interfacing the network device with the second network to:
identify the plurality of packets transmitted by the network device;
generate a plurality of log entries corresponding to the plurality of packets transmitted by the network device; and
communicate, to the system, the plurality of log entries corresponding to the plurality of packets transmitted by the network device;
correlate, based on the plurality of log entries corresponding to the plurality of packets received by the network device and the plurality of log entries corresponding to the plurality of packets transmitted by the network device, the plurality of packets transmitted by the network device with the plurality of packets received by the network device; and
responsive to correlating the plurality of packets transmitted by the network device with the plurality of packets received by the network device:
generate data identifying the host located in the first network; and
communicate, to a device located in the first network, the data identifying the host located in the first network.

23. The system of claim 22, wherein the instructions, when executed by the at least one processor, cause the system to:
configure the device in the communication link interfacing the network device with the first network to:
determine that the plurality of packets received by the network device are destined for a network address associated with the host located in the second network; and
determine that the network address associated with the host located in the second network is in the set of network addresses; and
configure the device in the communication link interfacing the network device with the second network to:
determine that the plurality of packets transmitted by the network device are destined for the network address associated with the host located in the second network; and
determine that the network address associated with the host located in the second network is in the set of network addresses.

24. The system of claim 23, wherein the instructions, when executed by the at least one processor, cause the system to:
generate a plurality of log entries comprising data indicating that the plurality of packets received by the network device are destined for the network address associated with the host located in the second network; and
generate a plurality of log entries comprising data indicating that the plurality of packets transmitted by the network device are destined for the network address associated with the host located in the second network.

25. The system of claim 24, wherein the instructions, when executed by the at least one processor, cause the system to correlate, each log entry of the plurality of log entries comprising the data indicating that the plurality of packets transmitted by the network device are destined for the network address associated with the host located in the second network with one or more log entries of the plurality of log entries comprising the data indicating that the plurality of packets received by the network device are destined for the network address associated with the host located in the second network.

26. The system of claim 24, wherein the instructions, when executed by the at least one processor, cause the system to generate a plurality of log entries comprising data indicating that a portion of the plurality of packets received by the network device were received from a network address associated with the host located in the first network.

27. The system of claim 26, wherein the data identifying the host located in the first network comprises the network address associated with the host located in the first network.

28. The system of claim 26, wherein the network device is configured to perform network address translation (NAT) for a plurality of network addresses associated with the first network, wherein the plurality of network addresses associated with the first network comprises the network address associated with the host located in the first network and a network address associated with a different host located in the first network, and wherein the instructions, when executed by the at least one processor, cause the system to generate a plurality of log entries comprising data indicating that a portion of the plurality of packets received by the network device were received from the network address associated with the different host located in the first network.

29. The system of claim 28, wherein the instructions, when executed by the at least one processor, cause the system to:
correlate a first portion of the plurality of log entries comprising the data indicating that the plurality of packets transmitted by the network device are destined for the network address associated with the host located in the second network with the plurality of log entries comprising the data indicating that the portion of the plurality of packets received by the network device were received from the network address associated with the host located in the first network; and correlate a second portion of the plurality of log entries comprising the data indicating that the plurality of packets transmitted by the network device are destined for the network address associated with the host located in the second network with the plurality of log entries comprising the data indicating that the portion of the plurality of packets received by the network device were received from the network address associated with the different host located in the first network.

30. The system of claim 22, wherein the instructions, when executed by the at least one processor, cause the system to correlate the plurality of packets transmitted by the network device with the plurality of packets received by the network device based on a comparison of one or more ports indicated by the plurality of log entries corresponding to the plurality of packets received by the network device with one or more ports indicated by the plurality of log entries corresponding to the plurality of packets transmitted by the network device.

31. The system of claim 22, wherein the instructions, when executed by the at least one processor, cause the system to correlate one or more protocol types indicated by the plurality of log entries corresponding to the plurality of packets received by the network device with one or more protocol types indicated by the plurality of log entries corresponding to the plurality of packets transmitted by the network device.

32. The system of claim 22, wherein the instructions, when executed by the at least one processor, cause the system to correlate the plurality of packets transmitted by the network device with the plurality of packets received by the network device based on a comparison of application-layer data indicated by the plurality of log entries corresponding to the plurality of packets received by the network device with application-layer data indicated by the plurality of log entries corresponding to the plurality of packets transmitted by the network device.

33. The system of claim 22, wherein the instructions, when executed by the at least one processor, cause the system to correlate the plurality of packets transmitted by the network device with the plurality of packets received by the network device based on a comparison of one or more network-interface identifiers of the network device indicated by the plurality of log entries corresponding to the plurality of packets received by the network device with one or more network-interface identifiers of the network device indicated by the plurality of log entries corresponding to the plurality of packets transmitted by the network device.

34. The system of claim 22, wherein the instructions, when executed by the at least one processor, cause the system to correlate the plurality of packets transmitted by the network device with the plurality of packets received by the network device based on a comparison of one or more times indicated by the plurality of log entries corresponding to the plurality of packets received by the network device with one or more times indicated by the plurality of log entries corresponding to the plurality of packets transmitted by the network device.

35. The system of claim 34, wherein the plurality of log entries corresponding to the plurality of packets received by the network device comprises a plurality of timestamps indicating times corresponding to receipt, by the network device, of the plurality of packets received by the network device, and wherein the plurality of log entries corresponding to the plurality of packets transmitted by the network device comprises a plurality of timestamps indicating times corresponding to transmission, by the network device, of the plurality of packets transmitted by the network device.

36. The system of claim 35, wherein the instructions, when executed by the at least one processor, cause the system to determine, for each timestamp of the plurality of timestamps indicating the times corresponding to transmission of the plurality of packets transmitted by the network device, that a difference between a time indicated by the timestamp and a time indicated by a timestamp of the plurality of timestamps indicating the times corresponding to receipt of the plurality of packets received by the network device is less than a threshold latency value for the network device.

37. The system of claim 35, wherein the instructions, when executed by the at least one processor, cause the system to:
determine a plurality of latency values for the network device, wherein the plurality of latency values comprises, for each timestamp of a first portion of the plurality of timestamps indicating the times corresponding to transmission of the plurality of packets transmitted by the network device, a difference between a time indicated by the timestamp and a time indicated by a timestamp of the plurality of timestamps indicating the times corresponding to receipt of the plurality of packets received by the network device;
determine, based on the plurality of latency values, an updated threshold latency value for the network device; and
determine, for each timestamp of a second portion of the plurality of timestamps indicating the times corresponding to transmission of the plurality of packets transmitted by the network device that a difference between a time indicated by the timestamp and a time indicated by a timestamp of the plurality of timestamps indicating the times corresponding to receipt of the plurality of packets received by the network device is less than the updated threshold latency value for the network device.

38. The system of claim 22, wherein:
the network device comprises a proxy configured to:
receive requests, for data from the host located in the second network, transmitted by the host located in the first network; and
generate requests corresponding to the requests transmitted by the host located in the first network and configured to cause the host located in the second network to transmit, to the network device, the data from the host located in the second network; and
the instructions, when executed by the at least one processor, cause the system to correlate the plurality of packets transmitted by the network device with the plurality of packets received by the network device based on a comparison of data from the requests transmitted by the host located in the first network with data from the requests corresponding to the requests transmitted by the host located in the first network.

39. The system of claim 22, wherein:
the network device comprises a gateway configured to:
receive, from the host located in the first network, data destined for the host located in the second network; and
generate one or more packets, destined for the host located in the second network, encapsulating the data destined for the host located in the second network; and
the instructions, when executed by the at least one processor, cause the system to correlate the plurality of packets transmitted by the network device with the plurality of packets received by the network device based on a comparison of at least a portion of the data destined for the host located in the second network with data from the one or more packets encapsulating the data destined for the host located in the second network.

40. The system of claim 22, wherein the host located in the second network is associated with a malicious entity, and wherein the instructions, when executed by the at least one processor, cause the system to generate data configured to cause the first network to drop packets transmitted by the host located in the first network.

41. The system of claim 22, wherein the communication link that interfaces the network device and the first network comprises a packet-filtering device, and wherein the instructions, when executed by the at least one processor, cause the system to:
- generate one or more rules configured to identify packets received from the host located in the first network;
- provision the packet-filtering device with the one or more rules configured to identify packets received from the host located in the first network; and
- configure the packet-filtering device to:
  - identify, based on the one or more rules configured to identify packets received from the host located in the first network, at least one packet received from the host located in the first network; and
  - responsive to identifying the at least one packet received from the host located in the first network, drop the at least one packet received from the host located in the first network.

42. The system of claim 22, wherein the instructions, when executed by the at least one processor, cause the system to:
- generate a message identifying the host located in the first network; and
- communicate, to at least one of the host located in the first network or a computing device associated with an administrator of the first network, the message identifying the host located in the first network.

43. One or more non-transitory computer-readable media comprising instructions that when executed by a computing system cause the computing system to:
- provision a device in a communication link interfacing a network device and a first network with one or more rules configured to identify a plurality of packets received by the network device from a host located in the first network;
- provision a device in a communication link interfacing the network device and a second network with one or more rules configured to identify a plurality of packets transmitted by the network device to a host located in a second network;
- provision the device in the communication link interfacing the network device and the first network and the device in the communication link interfacing the network device and the second network with one or more rules specifying a set of network addresses and configured to cause the computing system to log packets destined for one or more network addresses in the set of network addresses;
- configure the device in the communication link interfacing the network device with the first network to:
  - identify the plurality of packets received by the network device;
  - generate a plurality of log entries corresponding to the plurality of packets received by the network device; and
  - communicate, to the computing system, the plurality of log entries corresponding to the plurality of packets received by the network device;
- configure the device in the communication link interfacing the network device with the second network to:
  - identify the plurality of packets transmitted by the network device;
  - generate a plurality of log entries corresponding to the plurality of packets transmitted by the network device; and
  - communicate, to the computing system, the plurality of log entries corresponding to the plurality of packets transmitted by the network device;
- correlate, based on the plurality of log entries corresponding to the plurality of packets received by the network device and the plurality of log entries corresponding to the plurality of packets transmitted by the network device, the plurality of packets transmitted by the network device with the plurality of packets received by the network device; and
- responsive to correlating the plurality of packets transmitted by the network device with the plurality of packets received by the network device:
  - generate data identifying the host located in the first network; and
  - communicate, to a device located in the first network, the data identifying the host located in the first network.

44. The one or more non-transitory computer-readable media of claim 43, wherein the instructions, when executed by the computing system, cause the computing system to:
- configure the device in the communication link interfacing the network device with the first network to:
  - determine that the plurality of packets received by the network device are destined for a network address associated with the host located in the second network; and
  - determine that the network address associated with the host located in the second network is in the set of network addresses; and
- configure the device in the communication link interfacing the network device with the second network to:
  - determine that the plurality of packets transmitted by the network device are destined for the network address associated with the host located in the second network; and
  - determine that the network address associated with the host located in the second network is in the set of network addresses.

45. The one or more non-transitory computer-readable media of claim 44, wherein the instructions, when executed by the computing system, cause the computing system to:
- generate a plurality of log entries comprising data indicating that the plurality of packets received by the network device are destined for the network address associated with the host located in the second network; and
- generate a plurality of log entries comprising data indicating that the plurality of packets transmitted by the network device are destined for the network address associated with the host located in the second network.

46. The one or more non-transitory computer-readable media of claim 45, wherein the instructions, when executed by the computing system, cause the computing system to correlate, each log entry of the plurality of log entries comprising the data indicating that the plurality of packets transmitted by the network device are destined for the network address associated with the host located in the second network with one or more log entries of the plurality of log entries comprising the data indicating that the plurality of packets received by the network device are destined for the network address associated with the host located in the second network.

47. The one or more non-transitory computer-readable media of claim 45, wherein the instructions, when executed by the computing system, cause the computing system to generate a plurality of log entries comprising data indicating that a portion of the plurality of packets received by the network device were received from a network address associated with the host located in the first network.

48. The one or more non-transitory computer-readable media of claim 47, wherein the data identifying the host located in the first network comprises the network address associated with the host located in the first network.

49. The one or more non-transitory computer-readable media of claim 47, wherein the network device is configured to perform network address translation (NAT) for a plurality of network addresses associated with the first network, wherein the plurality of network addresses associated with the first network comprises the network address associated with the host located in the first network and a network address associated with a different host located in the first network, and wherein the instructions, when executed by the computing system, cause the computing system to generate a plurality of log entries comprising data indicating that a portion of the plurality of packets received by the network device were received from the network address associated with the different host located in the first network.

50. The one or more non-transitory computer-readable media of claim 49, wherein the instructions, when executed by the computing system, cause the computing system to:
- correlate a first portion of the plurality of log entries comprising the data indicating that the plurality of packets transmitted by the network device are destined for the network address associated with the host located in the second network with the plurality of log entries comprising the data indicating that the portion of the plurality of packets received by the network device were received from the network address associated with the host located in the first network; and
- correlate a second portion of the plurality of log entries comprising the data indicating that the plurality of packets transmitted by the network device are destined for the network address associated with the host located in the second network with the plurality of log entries comprising the data indicating that the portion of the plurality of packets received by the network device were received from the network address associated with the different host located in the first network.

51. The one or more non-transitory computer-readable media of claim 43, wherein the instructions, when executed by the computing system, cause the computing system to correlate the plurality of packets transmitted by the network device with the plurality of packets received by the network device based on a comparison of one or more ports indicated by the plurality of log entries corresponding to the plurality of packets received by the network device with one or more ports indicated by the plurality of log entries corresponding to the plurality of packets transmitted by the network device.

52. The one or more non-transitory computer-readable media of claim 43, wherein the instructions, when executed by the computing system, cause the computing system to correlate one or more protocol types indicated by the plurality of log entries corresponding to the plurality of packets received by the network device with one or more protocol types indicated by the plurality of log entries corresponding to the plurality of packets transmitted by the network device.

53. The one or more non-transitory computer-readable media of claim 43, wherein the instructions, when executed by the computing system, cause the computing system to correlate the plurality of packets transmitted by the network device with the plurality of packets received by the network device based on a comparison of application-layer data indicated by the plurality of log entries corresponding to the plurality of packets received by the network device with application-layer data indicated by the plurality of log entries corresponding to the plurality of packets transmitted by the network device.

54. The one or more non-transitory computer-readable media of claim 43, wherein the instructions, when executed by the computing system, cause the computing system to correlate the plurality of packets transmitted by the network device with the plurality of packets received by the network device based on a comparison of one or more network-interface identifiers of the network device indicated by the plurality of log entries corresponding to the plurality of packets received by the network device with one or more network-interface identifiers of the network device indicated by the plurality of log entries corresponding to the plurality of packets transmitted by the network device.

55. The one or more non-transitory computer-readable media of claim 43, wherein the instructions, when executed by the computing system, cause the computing system to correlate the plurality of packets transmitted by the network device with the plurality of packets received by the network device based on a comparison of one or more times indicated by the plurality of log entries corresponding to the plurality of packets received by the network device with one or more times indicated by the plurality of log entries corresponding to the plurality of packets transmitted by the network device.

56. The one or more non-transitory computer-readable media of claim 55, wherein the plurality of log entries corresponding to the plurality of packets received by the network device comprises a plurality of timestamps indicating times corresponding to receipt, by the network device, of the plurality of packets received by the network device, and wherein the plurality of log entries corresponding to the plurality of packets transmitted by the network device comprises a plurality of timestamps indicating times corresponding to transmission, by the network device, of the plurality of packets transmitted by the network device.

57. The one or more non-transitory computer-readable media of claim 56, wherein the instructions, when executed by the computing system, cause the computing system to determine, for each timestamp of the plurality of timestamps indicating the times corresponding to transmission of the plurality of packets transmitted by the network device, that a difference between a time indicated by the timestamp and a time indicated by a timestamp of the plurality of timestamps indicating the times corresponding to receipt of the plurality of packets received by the network device is less than a threshold latency value for the network device.

58. The one or more non-transitory computer-readable media of claim 56, wherein the instructions, when executed by the computing system, cause the computing system to:
- determine a plurality of latency values for the network device, wherein the plurality of latency values comprises, for each timestamp of a first portion of the plurality of timestamps indicating the times corresponding to transmission of the plurality of packets transmitted by the network device, a difference between a time indicated by the timestamp and a time indicated by a timestamp of the plurality of timestamps indicating the times corresponding to receipt of the plurality of packets received by the network device;

determine, based on the plurality of latency values, an updated threshold latency value for the network device; and determine, for each timestamp of a second portion of the plurality of timestamps indicating the times corresponding to transmission of the plurality of packets transmitted by the network device that a difference between a time indicated by the timestamp and a time indicated by a timestamp of the plurality of timestamps indicating the times corresponding to receipt of the plurality of packets received by the network device is less than the updated threshold latency value for the network device.

59. The one or more non-transitory computer-readable media of claim 43, wherein:

the network device comprises a proxy configured to:
receive requests, for data from the host located in the second network, transmitted by the host located in the first network; and
generate requests corresponding to the requests transmitted by the host located in the first network and configured to cause the host located in the second network to transmit, to the network device, the data from the host located in the second network; and the instructions, when executed by the computing system, cause the computing system to correlate the plurality of packets transmitted by the network device with the plurality of packets received by the network device based on a comparison of data from the requests transmitted by the host located in the first network with data from the requests corresponding to the requests transmitted by the host located in the first network.

60. The one or more non-transitory computer-readable media of claim 43, wherein:

the network device comprises a gateway configured to:
receive, from the host located in the first network, data destined for the host located in the second network; and
generate one or more packets, destined for the host located in the second network, encapsulating the data destined for the host located in the second network; and the instructions, when executed by the computing system, cause the computing system to correlate the plurality of packets transmitted by the network device with the plurality of packets received by the network device based on a comparison of at least a portion of the data destined for the host located in the second network with data from the one or more packets encapsulating the data destined for the host located in the second network.

61. The one or more non-transitory computer-readable media of claim 43, wherein the host located in the second network is associated with a malicious entity, and wherein the instructions, when executed by the computing system, cause the computing system to generate data configured to cause the first network to drop packets transmitted by the host located in the first network.

62. The one or more non-transitory computer-readable media of claim 43, wherein the communication link that interfaces the network device and the first network comprises a packet-filtering device, and wherein the instructions, when executed by the computing system, cause the computing system to:

generate one or more rules configured to identify packets received from the host located in the first network;
provision the packet-filtering device with the one or more rules configured to identify packets received from the host located in the first network; and
configure the packet-filtering device to:
identify, based on the one or more rules configured to identify packets received from the host located in the first network, at least one packet received from the host located in the first network; and
responsive to identifying the at least one packet received from the host located in the first network, drop the at least one packet received from the host located in the first network.

63. The one or more non-transitory computer-readable media of claim 43, wherein the instructions, when executed by the computing system, cause the computing system to:

generate a message identifying the host located in the first network; and
communicate, to at least one of the host located in the first network or a computing device associated with an administrator of the first network, the message identifying the host located in the first network.

64. A method comprising:

identifying, by a computing system, a plurality of packets received by a network device from a host located in a first network;

generating, by the computing system, a plurality of log entries corresponding to the plurality of packets received by the network device, the plurality of log entries corresponding to the plurality of packets received by the network device comprising a plurality of timestamps indicating times corresponding to receipt, by the network device, of the plurality of packets received by the network device;

identifying, by the computing system, a plurality of packets transmitted by the network device to a host located in a second network;

generating, by the computing system, a plurality of log entries corresponding to the plurality of packets transmitted by the network device, the plurality of log entries corresponding to the plurality of packets transmitted by the network device comprising a plurality of timestamps indicating times corresponding to transmission, by the network device, of the plurality of packets transmitted by the network device;

determining, by the computing system and for each timestamp of the plurality of timestamps indicating the times corresponding to transmission of the plurality of packets transmitted by the network device, that a difference between a time indicated by the timestamp and a time indicated by a timestamp of the plurality of timestamps indicating the times corresponding to receipt of the plurality of packets received by the network device is less than a threshold latency value for the network device;

correlating, by the computing system and based on the plurality of log entries corresponding to the plurality of packets received by the network device and the plurality of log entries corresponding to the plurality of packets transmitted by the network device, the plurality of packets transmitted by the network device with the plurality of packets received by the network device; and responsive to correlating the plurality of packets transmitted by the network device with the plurality of packets received by the network device:
generating, by the computing system, data identifying the host located in the first network; and
communicating, by the computing system and to a device located in the first network, the data identifying the host located in the first network.

65. The method of claim 64, comprising:
 determining, by the computing system, a plurality of latency values for the network device, wherein determining the plurality of latency values comprises determining, for each timestamp of a first portion of the plurality of timestamps indicating the times corresponding to transmission of the plurality of packets transmitted by the network device a difference between a time indicated by the timestamp and a time indicated by a timestamp of the plurality of timestamps indicating the times corresponding to receipt of the plurality of packets received by the network device;
 determining, by the computing system and based on the plurality of latency values, an updated threshold latency value for the network device; and
 determining, by the computing system and for each timestamp of a second portion of the plurality of timestamps indicating the times corresponding to transmission of the plurality of packets transmitted by the network device that a difference between a time indicated by the timestamp and a time indicated by a timestamp of the plurality of timestamps indicating the times corresponding to receipt of the plurality of packets received by the network device is less than the updated threshold latency value for the network device.

66. The method of claim 64, wherein correlating the plurality of packets transmitted by the network device with the plurality of packets received by the network device comprises comparing one or more ports indicated by the plurality of log entries corresponding to the plurality of packets received by the network device with one or more ports indicated by the plurality of log entries corresponding to the plurality of packets transmitted by the network device.

67. The method of claim 64, wherein correlating the plurality of packets transmitted by the network device with the plurality of packets received by the network device comprises correlating one or more protocol types indicated by the plurality of log entries corresponding to the plurality of packets received by the network device with one or more protocol types indicated by the plurality of log entries corresponding to the plurality of packets transmitted by the network device.

68. The method of claim 64, wherein correlating the plurality of packets transmitted by the network device with the plurality of packets received by the network device comprises comparing application-layer data indicated by the plurality of log entries corresponding to the plurality of packets received by the network device with application-layer data indicated by the plurality of log entries corresponding to the plurality of packets transmitted by the network device.

69. The method of claim 64, wherein correlating the plurality of packets transmitted by the network device with the plurality of packets received by the network device comprises comparing one or more network-interface identifiers of the network device indicated by the plurality of log entries corresponding to the plurality of packets received by the network device with one or more network-interface identifiers of the network device indicated by the plurality of log entries corresponding to the plurality of packets transmitted by the network device.

70. The method of claim 64, wherein correlating the plurality of packets transmitted by the network device with the plurality of packets received by the network device comprises comparing one or more times indicated by the plurality of log entries corresponding to the plurality of packets received by the network device with one or more times indicated by the plurality of log entries corresponding to the plurality of packets transmitted by the network device.

71. The method of claim 64, wherein:
 the network device comprises a proxy configured to:
  receive requests, for data from the host located in the second network, transmitted by the host located in the first network; and
  generate requests corresponding to the requests transmitted by the host located in the first network and configured to cause the host located in the second network to transmit, to the network device, the data from the host located in the second network; and
 correlating the plurality of packets transmitted by the network device with the plurality of packets received by the network device comprises comparing data from the requests transmitted by the host located in the first network with data from the requests corresponding to the requests transmitted by the host located in the first network.

72. The method of claim 64, wherein:
 the network device comprises a gateway configured to:
  receive, from the host located in the first network, data destined for the host located in the second network; and
  generate one or more packets, destined for the host located in the second network, encapsulating the data destined for the host located in the second network; and
 correlating the plurality of packets transmitted by the network device with the plurality of packets received by the network device comprises comparing at least a portion of the data destined for the host located in the second network with data from the one or more packets encapsulating the data destined for the host located in the second network.

73. The method of claim 64, wherein the host located in the second network is associated with a malicious entity, the method comprising generating, by the computing system, data configured to cause the first network to drop packets transmitted by the host located in the first network.

74. The method of claim 64, wherein a communication path that interfaces the network device and the first network comprises a packet-filtering device, the method comprising:
 generating, by the computing system, one or more rules configured to identify packets received from the host located in the first network;
 provisioning, by the computing system, the packet-filtering device with the one or more rules configured to identify packets received from the host located in the first network;
 identifying, by the packet-filtering device and based on the one or more rules configured to identify packets received from the host located in the first network, at least one packet received from the host located in the first network; and
 responsive to identifying the at least one packet received from the host located in the first network, dropping, by the packet-filtering device, the at least one packet received from the host located in the first network.

75. The method of claim 64, comprising:
 generating, by the computing system, a message identifying the host located in the first network; and
 communicating, by the computing system and to at least one of the host located in the first network or a computing device associated with an administrator of the first network, the message identifying the host located in the first network.

76. A system comprising:
at least one processor; and
a memory storing instructions that when executed by the at least one processor cause the system to:
- identify a plurality of packets received by a network device from a host located in a first network;
- generate a plurality of log entries corresponding to the plurality of packets received by the network device, the plurality of log entries corresponding to the plurality of packets received by the network device comprising a plurality of timestamps indicating times corresponding to receipt, by the network device, of the plurality of packets received by the network device;
- identify a plurality of packets transmitted by the network device to a host located in a second network;
- generate a plurality of log entries corresponding to the plurality of packets transmitted by the network device, the plurality of log entries corresponding to the plurality of packets transmitted by the network device comprising a plurality of timestamps indicating times corresponding to transmission, by the network device, of the plurality of packets transmitted by the network device;
- determine, for each timestamp of the plurality of timestamps indicating the times corresponding to transmission of the plurality of packets transmitted by the network device, that a difference between a time indicated by the timestamp and a time indicated by a timestamp of the plurality of timestamps indicating the times corresponding to receipt of the plurality of packets received by the network device is less than a threshold latency value for the network device;
- correlate, based on the plurality of log entries corresponding to the plurality of packets received by the network device and the plurality of log entries corresponding to the plurality of packets transmitted by the network device, the plurality of packets transmitted by the network device with the plurality of packets received by the network device; and
- responsive to correlating the plurality of packets transmitted by the network device with the plurality of packets received by the network device:
  - generate data identifying the host located in the first network; and
  - communicate, to a device located in the first network, the data identifying the host located in the first network.

77. The system of claim 76, wherein the instructions, when executed by the at least one processor, cause the system to:
- determine a plurality of latency values for the network device, wherein the plurality of latency values comprises, for each timestamp of a first portion of the plurality of timestamps indicating the times corresponding to transmission of the plurality of packets transmitted by the network device, a difference between a time indicated by the timestamp and a time indicated by a timestamp of the plurality of timestamps indicating the times corresponding to receipt of the plurality of packets received by the network device;
- determine, based on the plurality of latency values, an updated threshold latency value for the network device; and
- determine, for each timestamp of a second portion of the plurality of timestamps indicating the times corresponding to transmission of the plurality of packets transmitted by the network device that a difference between a time indicated by the timestamp and a time indicated by a timestamp of the plurality of timestamps indicating the times corresponding to receipt of the plurality of packets received by the network device is less than the updated threshold latency value for the network device.

78. The system of claim 76, wherein the instructions, when executed by the at least one processor, cause the system to correlate the plurality of packets transmitted by the network device with the plurality of packets received by the network device based on a comparison of one or more ports indicated by the plurality of log entries corresponding to the plurality of packets received by the network device with one or more ports indicated by the plurality of log entries corresponding to the plurality of packets transmitted by the network device.

79. The system of claim 76, wherein the instructions, when executed by the at least one processor, cause the system to correlate one or more protocol types indicated by the plurality of log entries corresponding to the plurality of packets received by the network device with one or more protocol types indicated by the plurality of log entries corresponding to the plurality of packets transmitted by the network device.

80. The system of claim 76, wherein the instructions, when executed by the at least one processor, cause the system to correlate the plurality of packets transmitted by the network device with the plurality of packets received by the network device based on a comparison of application-layer data indicated by the plurality of log entries corresponding to the plurality of packets received by the network device with application-layer data indicated by the plurality of log entries corresponding to the plurality of packets transmitted by the network device.

81. The system of claim 76, wherein the instructions, when executed by the at least one processor, cause the system to correlate the plurality of packets transmitted by the network device with the plurality of packets received by the network device based on a comparison of one or more network-interface identifiers of the network device indicated by the plurality of log entries corresponding to the plurality of packets received by the network device with one or more network-interface identifiers of the network device indicated by the plurality of log entries corresponding to the plurality of packets transmitted by the network device.

82. The system of claim 76, wherein the instructions, when executed by the at least one processor, cause the system to correlate the plurality of packets transmitted by the network device with the plurality of packets received by the network device based on a comparison of one or more times indicated by the plurality of log entries corresponding to the plurality of packets received by the network device with one or more times indicated by the plurality of log entries corresponding to the plurality of packets transmitted by the network device.

83. The system of claim 76, wherein:
the network device comprises a proxy configured to:
- receive requests, for data from the host located in the second network, transmitted by the host located in the first network; and
- generate requests corresponding to the requests transmitted by the host located in the first network and configured to cause the host located in the second network to transmit, to the network device, the data from the host located in the second network; and the instructions, when executed by the at least one processor, cause the system to correlate the plurality of packets transmitted by the network device with the plurality of packets received by the network device based on a comparison of data from the requests transmitted by the host located in the first network with data from the requests corresponding to the requests transmitted by the host located in the first network.

84. The system of claim 76, wherein:
the network device comprises a gateway configured to:
  receive, from the host located in the first network, data destined for the host located in the second network; and
  generate one or more packets, destined for the host located in the second network, encapsulating the data destined for the host located in the second network; and
the instructions, when executed by the at least one processor, cause the system to correlate the plurality of packets transmitted by the network device with the plurality of packets received by the network device based on a comparison of at least a portion of the data destined for the host located in the second network with data from the one or more packets encapsulating the data destined for the host located in the second network.

85. The system of claim 76, wherein the host located in the second network is associated with a malicious entity, and wherein the instructions, when executed by the at least one processor, cause the system to generate data configured to cause the first network to drop packets transmitted by the host located in the first network.

86. The system of claim 76, wherein a communication link that interfaces the network device and the first network comprises a packet-filtering device, and wherein the instructions, when executed by the at least one processor, cause the system to:
  generate one or more rules configured to identify packets received from the host located in the first network;
  provision the packet-filtering device with the one or more rules configured to identify packets received from the host located in the first network; and
  configure the packet-filtering device to:
    identify, based on the one or more rules configured to identify packets received from the host located in the first network, at least one packet received from the host located in the first network; and
    responsive to identifying the at least one packet received from the host located in the first network, drop the at least one packet received from the host located in the first network.

87. The system of claim 76, wherein the instructions, when executed by the at least one processor, cause the system to:
  generate a message identifying the host located in the first network; and
  communicate, to at least one of the host located in the first network or a computing device associated with an administrator of the first network, the message identifying the host located in the first network.

88. One or more non-transitory computer-readable media comprising instructions that when executed by a computing system cause the computing system to:
  identify a plurality of packets received by a network device from a host located in a first network;
  generate a plurality of log entries corresponding to the plurality of packets received by the network device, the plurality of log entries corresponding to the plurality of packets received by the network device comprising a plurality of timestamps indicating times corresponding to receipt, by the network device, of the plurality of packets received by the network device;
  identify a plurality of packets transmitted by the network device to a host located in a second network;
  generate a plurality of log entries corresponding to the plurality of packets transmitted by the network device, the plurality of log entries corresponding to the plurality of packets transmitted by the network device comprising a plurality of timestamps indicating times corresponding to transmission, by the network device, of the plurality of packets transmitted by the network device;
  determine, for each timestamp of the plurality of timestamps indicating the times corresponding to transmission of the plurality of packets transmitted by the network device, that a difference between a time indicated by the timestamp and a time indicated by a timestamp of the plurality of timestamps indicating the times corresponding to receipt of the plurality of packets received by the network device is less than a threshold latency value for the network device;
  correlate, based on the plurality of log entries corresponding to the plurality of packets received by the network device and the plurality of log entries corresponding to the plurality of packets transmitted by the network device, the plurality of packets transmitted by the network device with the plurality of packets received by the network device; and
  responsive to correlating the plurality of packets transmitted by the network device with the plurality of packets received by the network device:
    generate data identifying the host located in the first network; and
    communicate, to a device located in the first network, the data identifying the host located in the first network.

89. The one or more non-transitory computer-readable media of claim 88, wherein the instructions, when executed by the computing system, cause the computing system to:
  determine a plurality of latency values for the network device, wherein the plurality of latency values comprises, for each timestamp of a first portion of the plurality of timestamps indicating the times corresponding to transmission of the plurality of packets transmitted by the network device, a difference between a time indicated by the timestamp and a time indicated by a timestamp of the plurality of timestamps indicating the times corresponding to receipt of the plurality of packets received by the network device;
  determine, based on the plurality of latency values, an updated threshold latency value for the network device; and
  determine, for each timestamp of a second portion of the plurality of timestamps indicating the times corresponding to transmission of the plurality of packets transmitted by the network device that a difference between a time indicated by the timestamp and a time indicated by a timestamp of the plurality of timestamps indicating the times corresponding to receipt of the plurality of packets received by the network device is less than the updated threshold latency value for the network device.

90. The one or more non-transitory computer-readable media of claim 88, wherein the instructions, when executed by the computing system, cause the computing system to correlate the plurality of packets transmitted by the network device with the plurality of packets received by the network device based on a comparison of one or more ports indicated by the plurality of log entries corresponding to the plurality of packets received by the network device with one or more ports indicated by the plurality of log entries corresponding to the plurality of packets transmitted by the network device.

91. The one or more non-transitory computer-readable media of claim 88, wherein the instructions, when executed by the computing system, cause the computing system to correlate one or more protocol types indicated by the plurality of log entries corresponding to the plurality of packets received by the network device with one or more protocol types indicated by the plurality of log entries corresponding to the plurality of packets transmitted by the network device.

92. The one or more non-transitory computer-readable media of claim 88, wherein the instructions, when executed by the computing system, cause the computing system to correlate the plurality of packets transmitted by the network device with the plurality of packets received by the network device based on a comparison of application-layer data indicated by the plurality of log entries corresponding to the plurality of packets received by the network device with application-layer data indicated by the plurality of log entries corresponding to the plurality of packets transmitted by the network device.

93. The one or more non-transitory computer-readable media of claim 88, wherein the instructions, when executed by the computing system, cause the computing system to correlate the plurality of packets transmitted by the network device with the plurality of packets received by the network device based on a comparison of one or more network-interface identifiers of the network device indicated by the plurality of log entries corresponding to the plurality of packets received by the network device with one or more network-interface identifiers of the network device indicated by the plurality of log entries corresponding to the plurality of packets transmitted by the network device.

94. The one or more non-transitory computer-readable media of claim 88, wherein the instructions, when executed by the computing system, cause the computing system to correlate the plurality of packets transmitted by the network device with the plurality of packets received by the network device based on a comparison of one or more times indicated by the plurality of log entries corresponding to the plurality of packets received by the network device with one or more times indicated by the plurality of log entries corresponding to the plurality of packets transmitted by the network device.

95. The one or more non-transitory computer-readable media of claim 88, wherein:
the network device comprises a proxy configured to:
receive requests, for data from the host located in the second network, transmitted by the host located in the first network; and
generate requests corresponding to the requests transmitted by the host located in the first network and configured to cause the host located in the second network to transmit, to the network device, the data from the host located in the second network; and
the instructions, when executed by the computing system, cause the computing system to correlate the plurality of packets transmitted by the network device with the plurality of packets received by the network device based on a comparison of data from the requests transmitted by the host located in the first network with data from the requests corresponding to the requests transmitted by the host located in the first network.

96. The one or more non-transitory computer-readable media of claim 88, wherein:
the network device comprises a gateway configured to:
receive, from the host located in the first network, data destined for the host located in the second network; and
generate one or more packets, destined for the host located in the second network, encapsulating the data destined for the host located in the second network; and
the instructions, when executed by the computing system, cause the computing system to correlate the plurality of packets transmitted by the network device with the plurality of packets received by the network device based on a comparison of at least a portion of the data destined for the host located in the second network with data from the one or more packets encapsulating the data destined for the host located in the second network.

97. The one or more non-transitory computer-readable media of claim 88, wherein the host located in the second network is associated with a malicious entity, and wherein the instructions, when executed by the computing system, cause the computing system to generate data configured to cause the first network to drop packets transmitted by the host located in the first network.

98. The one or more non-transitory computer-readable media of claim 88, wherein a communication link that interfaces the network device and the first network comprises a packet-filtering device, and wherein the instructions, when executed by the computing system, cause the computing system to:
generate one or more rules configured to identify packets received from the host located in the first network;
provision the packet-filtering device with the one or more rules configured to identify packets received from the host located in the first network; and
configure the packet-filtering device to:
identify, based on the one or more rules configured to identify packets received from the host located in the first network, at least one packet received from the host located in the first network; and
responsive to identifying the at least one packet received from the host located in the first network, drop the at least one packet received from the host located in the first network.

99. The one or more non-transitory computer-readable media of claim 88, wherein the instructions, when executed by the computing system, cause the computing system to:
generate a message identifying the host located in the first network; and
communicate, to at least one of the host located in the first network or a computing device associated with an administrator of the first network, the message identifying the host located in the first network.

100. A method comprising:
identifying, by a computing system, a plurality of packets received by a network device from a host located in a first network;
generating, by the computing system, a plurality of log entries corresponding to the plurality of packets received by the network device, the plurality of log entries corresponding to the plurality of packets received by the network device comprising a plurality of timestamps indicating times corresponding to receipt, by the network device, of the plurality of packets received by the network device;
identifying, by the computing system, a plurality of packets transmitted by the network device to a host located in a second network;
generating, by the computing system, a plurality of log entries corresponding to the plurality of packets transmitted by the network device, the plurality of log entries corresponding to the plurality of packets transmitted by the network device comprising a plurality of timestamps indicating times corresponding to transmission, by the network device, of the plurality of packets transmitted by the network device;

determining, by the computing system, a plurality of latency values for the network device, wherein determining the plurality of latency values comprises determining, for each timestamp of a first portion of the plurality of timestamps indicating the times corresponding to transmission of the plurality of packets transmitted by the network device a difference between a time indicated by the timestamp and a time indicated by a timestamp of the plurality of timestamps indicating the times corresponding to receipt of the plurality of packets received by the network device;

determining, by the computing system and based on the plurality of latency values, a threshold latency value for the network device;

determining, by the computing system and for each timestamp of a second portion of the plurality of timestamps indicating the times corresponding to transmission of the plurality of packets transmitted by the network device that a difference between a time indicated by the timestamp and a time indicated by a timestamp of the plurality of timestamps indicating the times corresponding to receipt of the plurality of packets received by the network device is less than the threshold latency value for the network device;

correlating, by the computing system and based on the plurality of log entries corresponding to the plurality of packets received by the network device and the plurality of log entries corresponding to the plurality of packets transmitted by the network device, the plurality of packets transmitted by the network device with the plurality of packets received by the network device; and responsive to correlating the plurality of packets transmitted by the network device with the plurality of packets received by the network device:
    generating, by the computing system, data identifying the host located in the first network; and
    communicating, by the computing system and to a device located in the first network, the data identifying the host located in the first network.

101. The method of claim 100, wherein correlating the plurality of packets transmitted by the network device with the plurality of packets received by the network device comprises comparing one or more ports indicated by the plurality of log entries corresponding to the plurality of packets received by the network device with one or more ports indicated by the plurality of log entries corresponding to the plurality of packets transmitted by the network device.

102. The method of claim 100, wherein correlating the plurality of packets transmitted by the network device with the plurality of packets received by the network device comprises correlating one or more protocol types indicated by the plurality of log entries corresponding to the plurality of packets received by the network device with one or more protocol types indicated by the plurality of log entries corresponding to the plurality of packets transmitted by the network device.

103. The method of claim 100, wherein correlating the plurality of packets transmitted by the network device with the plurality of packets received by the network device comprises comparing application-layer data indicated by the plurality of log entries corresponding to the plurality of packets received by the network device with application-layer data indicated by the plurality of log entries corresponding to the plurality of packets transmitted by the network device.

104. The method of claim 100, wherein correlating the plurality of packets transmitted by the network device with the plurality of packets received by the network device comprises comparing one or more network-interface identifiers of the network device indicated by the plurality of log entries corresponding to the plurality of packets received by the network device with one or more network-interface identifiers of the network device indicated by the plurality of log entries corresponding to the plurality of packets transmitted by the network device.

105. The method of claim 100, wherein correlating the plurality of packets transmitted by the network device with the plurality of packets received by the network device comprises comparing one or more times indicated by the plurality of log entries corresponding to the plurality of packets received by the network device with one or more times indicated by the plurality of log entries corresponding to the plurality of packets transmitted by the network device.

106. The method of claim 100, wherein:
the network device comprises a proxy configured to:
    receive requests, for data from the host located in the second network, transmitted by the host located in the first network; and
    generate requests corresponding to the requests transmitted by the host located in the first network and configured to cause the host located in the second network to transmit, to the network device, the data from the host located in the second network; and
correlating the plurality of packets transmitted by the network device with the plurality of packets received by the network device comprises comparing data from the requests transmitted by the host located in the first network with data from the requests corresponding to the requests transmitted by the host located in the first network.

107. The method of claim 100, wherein:
the network device comprises a gateway configured to:
    receive, from the host located in the first network, data destined for the host located in the second network; and
    generate one or more packets, destined for the host located in the second network, encapsulating the data destined for the host located in the second network; and
correlating the plurality of packets transmitted by the network device with the plurality of packets received by the network device comprises comparing at least a portion of the data destined for the host located in the second network with data from the one or more packets encapsulating the data destined for the host located in the second network.

108. The method of claim 100, wherein the host located in the second network is associated with a malicious entity, the method comprising generating, by the computing system, data configured to cause the first network to drop packets transmitted by the host located in the first network.

109. The method of claim 100, wherein a communication path that interfaces the network device and the first network comprises a packet-filtering device, the method comprising:
    generating, by the computing system, one or more rules configured to identify packets received from the host located in the first network;
    provisioning, by the computing system, the packet-filtering device with the one or more rules configured to identify packets received from the host located in the first network;

identifying, by the packet-filtering device and based on the one or more rules configured to identify packets received from the host located in the first network, at least one packet received from the host located in the first network; and responsive to identifying the at least one packet received from the host located in the first network, dropping, by the packet-filtering device, the at least one packet received from the host located in the first network.

110. The method of claim 100, comprising:

generating, by the computing system, a message identifying the host located in the first network; and communicating, by the computing system and to at least one of the host located in the first network or a computing device associated with an administrator of the first network, the message identifying the host located in the first network.

111. A system comprising:

at least one processor; and a memory storing instructions that when executed by the at least one processor cause the system to:

identify a plurality of packets received by a network device from a host located in a first network;

generate a plurality of log entries corresponding to the plurality of packets received by the network device, the plurality of log entries corresponding to the plurality of packets received by the network device comprising a plurality of timestamps indicating times corresponding to receipt, by the network device, of the plurality of packets received by the network device;

identify a plurality of packets transmitted by the network device to a host located in a second network;

generate a plurality of log entries corresponding to the plurality of packets transmitted by the network device, the plurality of log entries corresponding to the plurality of packets transmitted by the network device comprising a plurality of timestamps indicating times corresponding to transmission, by the network device, of the plurality of packets transmitted by the network device;

determine a plurality of latency values for the network device, wherein the plurality of latency values comprises, for each timestamp of a first portion of the plurality of timestamps indicating the times corresponding to transmission of the plurality of packets transmitted by the network device, a difference between a time indicated by the timestamp and a time indicated by a timestamp of the plurality of timestamps indicating the times corresponding to receipt of the plurality of packets received by the network device;

determine, based on the plurality of latency values, a threshold latency value for the network device;

determine, for each timestamp of a second portion of the plurality of timestamps indicating the times corresponding to transmission of the plurality of packets transmitted by the network device that a difference between a time indicated by the timestamp and a time indicated by a timestamp of the plurality of timestamps indicating the times corresponding to receipt of the plurality of packets received by the network device is less than the threshold latency value for the network device;

correlate, based on the plurality of log entries corresponding to the plurality of packets received by the network device and the plurality of log entries corresponding to the plurality of packets transmitted by the network device, the plurality of packets transmitted by the network device with the plurality of packets received by the network device; and responsive to correlating the plurality of packets transmitted by the network device with the plurality of packets received by the network device:

generate data identifying the host located in the first network; and communicate, to a device located in the first network, the data identifying the host located in the first network.

112. The system of claim 111, wherein the instructions, when executed by the at least one processor, cause the system to correlate the plurality of packets transmitted by the network device with the plurality of packets received by the network device based on a comparison of one or more ports indicated by the plurality of log entries corresponding to the plurality of packets received by the network device with one or more ports indicated by the plurality of log entries corresponding to the plurality of packets transmitted by the network device.

113. The system of claim 111, wherein the instructions, when executed by the at least one processor, cause the system to correlate one or more protocol types indicated by the plurality of log entries corresponding to the plurality of packets received by the network device with one or more protocol types indicated by the plurality of log entries corresponding to the plurality of packets transmitted by the network device.

114. The system of claim 111, wherein the instructions, when executed by the at least one processor, cause the system to correlate the plurality of packets transmitted by the network device with the plurality of packets received by the network device based on a comparison of application-layer data indicated by the plurality of log entries corresponding to the plurality of packets received by the network device with application-layer data indicated by the plurality of log entries corresponding to the plurality of packets transmitted by the network device.

115. The system of claim 111, wherein the instructions, when executed by the at least one processor, cause the system to correlate the plurality of packets transmitted by the network device with the plurality of packets received by the network device based on a comparison of one or more network-interface identifiers of the network device indicated by the plurality of log entries corresponding to the plurality of packets received by the network device with one or more network-interface identifiers of the network device indicated by the plurality of log entries corresponding to the plurality of packets transmitted by the network device.

116. The system of claim 111, wherein the instructions, when executed by the at least one processor, cause the system to correlate the plurality of packets transmitted by the network device with the plurality of packets received by the network device based on a comparison of one or more times indicated by the plurality of log entries corresponding to the plurality of packets received by the network device with one or more times indicated by the plurality of log entries corresponding to the plurality of packets transmitted by the network device.

117. The system of claim 111, wherein:

the network device comprises a proxy configured to:

receive requests, for data from the host located in the second network, transmitted by the host located in the first network; and generate requests corresponding to the requests transmitted by the host located in the first network and configured to cause the host located in the second network to transmit, to the network device, the data from the host located in the second network; and the instructions, when executed by the at least one processor, cause the system to correlate the plurality of packets transmitted by the network device with the plurality of packets received by the network device based on a comparison of data from the requests transmitted by the host located in the first network with data from the requests corresponding to the requests transmitted by the host located in the first network.

118. The system of claim 111, wherein:
the network device comprises a gateway configured to:
  receive, from the host located in the first network, data destined for the host located in the second network; and
  generate one or more packets, destined for the host located in the second network, encapsulating the data destined for the host located in the second network; and
the instructions, when executed by the at least one processor, cause the system to correlate the plurality of packets transmitted by the network device with the plurality of packets received by the network device based on a comparison of at least a portion of the data destined for the host located in the second network with data from the one or more packets encapsulating the data destined for the host located in the second network.

119. The system of claim 111, wherein the host located in the second network is associated with a malicious entity, and wherein the instructions, when executed by the at least one processor, cause the system to generate data configured to cause the first network to drop packets transmitted by the host located in the first network.

120. The system of claim 111, wherein a communication link that interfaces the network device and the first network comprises a packet-filtering device, and wherein the instructions, when executed by the at least one processor, cause the system to:
  generate one or more rules configured to identify packets received from the host located in the first network;
  provision the packet-filtering device with the one or more rules configured to identify packets received from the host located in the first network; and
  configure the packet-filtering device to:
    identify, based on the one or more rules configured to identify packets received from the host located in the first network, at least one packet received from the host located in the first network; and
    responsive to identifying the at least one packet received from the host located in the first network, drop the at least one packet received from the host located in the first network.

121. The system of claim 111, wherein the instructions, when executed by the at least one processor, cause the system to:
  generate a message identifying the host located in the first network; and
  communicate, to at least one of the host located in the first network or a computing device associated with an administrator of the first network, the message identifying the host located in the first network.

122. One or more non-transitory computer-readable media comprising instructions that when executed by a computing system cause the computing system to:
  identify a plurality of packets received by a network device from a host located in a first network;
  generate a plurality of log entries corresponding to the plurality of packets received by the network device, the plurality of log entries corresponding to the plurality of packets received by the network device comprising a plurality of timestamps indicating times corresponding to receipt, by the network device, of the plurality of packets received by the network device;
  identify a plurality of packets transmitted by the network device to a host located in a second network;
  generate a plurality of log entries corresponding to the plurality of packets transmitted by the network device, the plurality of log entries corresponding to the plurality of packets transmitted by the network device comprising a plurality of timestamps indicating times corresponding to transmission, by the network device, of the plurality of packets transmitted by the network device;
  determine a plurality of latency values for the network device, wherein the plurality of latency values comprises, for each timestamp of a first portion of the plurality of timestamps indicating the times corresponding to transmission of the plurality of packets transmitted by the network device, a difference between a time indicated by the timestamp and a time indicated by a timestamp of the plurality of timestamps indicating the times corresponding to receipt of the plurality of packets received by the network device;
  determine, based on the plurality of latency values, a threshold latency value for the network device;
  determine, for each timestamp of a second portion of the plurality of timestamps indicating the times corresponding to transmission of the plurality of packets transmitted by the network device that a difference between a time indicated by the timestamp and a time indicated by a timestamp of the plurality of timestamps indicating the times corresponding to receipt of the plurality of packets received by the network device is less than the threshold latency value for the network device;
  correlate, based on the plurality of log entries corresponding to the plurality of packets received by the network device and the plurality of log entries corresponding to the plurality of packets transmitted by the network device, the plurality of packets transmitted by the network device with the plurality of packets received by the network device; and
  responsive to correlating the plurality of packets transmitted by the network device with the plurality of packets received by the network device:
    generate data identifying the host located in the first network; and
    communicate, to a device located in the first network, the data identifying the host located in the first network.

123. The one or more non-transitory computer-readable media of claim 122, wherein the instructions, when executed by the computing system, cause the computing system to correlate the plurality of packets transmitted by the network device with the plurality of packets received by the network device based on a comparison of one or more ports indicated by the plurality of log entries corresponding to the plurality of packets received by the network device with one or more ports indicated by the plurality of log entries corresponding to the plurality of packets transmitted by the network device.

124. The one or more non-transitory computer-readable media of claim 122, wherein the instructions, when executed by the computing system, cause the computing system to correlate one or more protocol types indicated by the plurality of log entries corresponding to the plurality of packets received by the network device with one or more protocol types indicated by the plurality of log entries corresponding to the plurality of packets transmitted by the network device.

125. The one or more non-transitory computer-readable media of claim 122, wherein the instructions, when executed by the computing system, cause the computing system to correlate the plurality of packets transmitted by the network device with the plurality of packets received by the network device based on a comparison of application-layer data indicated by the plurality of log entries corresponding to the plurality of packets received by the network device with application-layer data indicated by the plurality of log entries corresponding to the plurality of packets transmitted by the network device.

126. The one or more non-transitory computer-readable media of claim 122, wherein the instructions, when executed by the computing system, cause the computing system to correlate the plurality of packets transmitted by the network device with the plurality of packets received by the network device based on a comparison of one or more network-interface identifiers of the network device indicated by the plurality of log entries corresponding to the plurality of packets received by the network device with one or more network-interface identifiers of the network device indicated by the plurality of log entries corresponding to the plurality of packets transmitted by the network device.

127. The one or more non-transitory computer-readable media of claim 122, wherein the instructions, when executed by the computing system, cause the computing system to correlate the plurality of packets transmitted by the network device with the plurality of packets received by the network device based on a comparison of one or more times indicated by the plurality of log entries corresponding to the plurality of packets received by the network device with one or more times indicated by the plurality of log entries corresponding to the plurality of packets transmitted by the network device.

128. The one or more non-transitory computer-readable media of claim 122, wherein:
the network device comprises a proxy configured to:
receive requests, for data from the host located in the second network, transmitted by the host located in the first network; and
generate requests corresponding to the requests transmitted by the host located in the first network and configured to cause the host located in the second network to transmit, to the network device, the data from the host located in the second network; and
the instructions, when executed by the computing system, cause the computing system to correlate the plurality of packets transmitted by the network device with the plurality of packets received by the network device based on a comparison of data from the requests transmitted by the host located in the first network with data from the requests corresponding to the requests transmitted by the host located in the first network.

129. The one or more non-transitory computer-readable media of claim 122, wherein:
the network device comprises a gateway configured to:
receive, from the host located in the first network, data destined for the host located in the second network; and
generate one or more packets, destined for the host located in the second network, encapsulating the data destined for the host located in the second network; and
the instructions, when executed by the computing system, cause the computing system to correlate the plurality of packets transmitted by the network device with the plurality of packets received by the network device based on a comparison of at least a portion of the data destined for the host located in the second network with data from the one or more packets encapsulating the data destined for the host located in the second network.

130. The one or more non-transitory computer-readable media of claim 122, wherein the host located in the second network is associated with a malicious entity, and wherein the instructions, when executed by the computing system, cause the computing system to generate data configured to cause the first network to drop packets transmitted by the host located in the first network.

131. The one or more non-transitory computer-readable media of claim 122, wherein a communication link that interfaces the network device and the first network comprises a packet-filtering device, and wherein the instructions, when executed by the computing system, cause the computing system to:
generate one or more rules configured to identify packets received from the host located in the first network;
provision the packet-filtering device with the one or more rules configured to identify packets received from the host located in the first network; and
configure the packet-filtering device to:
identify, based on the one or more rules configured to identify packets received from the host located in the first network, at least one packet received from the host located in the first network; and
responsive to identifying the at least one packet received from the host located in the first network, drop the at least one packet received from the host located in the first network.

132. The one or more non-transitory computer-readable media of claim 122, wherein the instructions, when executed by the computing system, cause the computing system to:
generate a message identifying the host located in the first network; and
communicate, to at least one of the host located in the first network or a computing device associated with an administrator of the first network, the message identifying the host located in the first network.

133. A method comprising:
identifying, by a computing system, a plurality of packets received by a proxy device from a host located in a first network, the proxy device being configured to receive requests, for data from a host located in a second network, transmitted by the host located in the first network, and the proxy device being configured to generate requests corresponding to the requests transmitted by the host located in the first network and configured to cause the host located in the second network to transmit, to the proxy device, the data from the host located in the second network;
generating, by the computing system, a plurality of log entries corresponding to the plurality of packets received by the proxy device;
identifying, by the computing system, a plurality of packets transmitted by the proxy device to the host located in the second network;
generating, by the computing system, a plurality of log entries corresponding to the plurality of packets transmitted by the proxy device;
correlating, by the computing system and based on the plurality of log entries corresponding to the plurality of packets received by the proxy device, the plurality of log entries corresponding to the plurality of packets transmitted by the proxy device, and a comparison of data from the requests transmitted by the host located in the first network with data from the requests corresponding to the requests transmitted by the host located in the first network, the plurality of packets transmitted by the proxy device with the plurality of packets received by the proxy device; and responsive to correlating the plurality of packets transmitted by the proxy device with the plurality of packets received by the proxy device:
generating, by the computing system, data identifying the host located in the first network; and
communicating, by the computing system and to a device located in the first network, the data identifying the host located in the first network.

134. The method of claim 133, wherein correlating the plurality of packets transmitted by the proxy device with the plurality of packets received by the proxy device comprises comparing one or more ports indicated by the plurality of log entries corresponding to the plurality of packets received by the proxy device with one or more ports indicated by the plurality of log entries corresponding to the plurality of packets transmitted by the proxy device.

135. The method of claim 133, wherein correlating the plurality of packets transmitted by the proxy device with the plurality of packets received by the proxy device comprises correlating one or more protocol types indicated by the plurality of log entries corresponding to the plurality of packets received by the proxy device with one or more protocol types indicated by the plurality of log entries corresponding to the plurality of packets transmitted by the proxy device.

136. The method of claim 133, wherein correlating the plurality of packets transmitted by the proxy device with the plurality of packets received by the proxy device comprises comparing application-layer data indicated by the plurality of log entries corresponding to the plurality of packets received by the proxy device with application-layer data indicated by the plurality of log entries corresponding to the plurality of packets transmitted by the proxy device.

137. The method of claim 133, wherein correlating the plurality of packets transmitted by the proxy device with the plurality of packets received by the proxy device comprises comparing one or more network-interface identifiers indicated by the plurality of log entries corresponding to the plurality of packets received by the proxy device with one or more network-interface identifiers indicated by the plurality of log entries corresponding to the plurality of packets transmitted by the proxy device.

138. The method of claim 133, wherein correlating the plurality of packets transmitted by the proxy device with the plurality of packets received by the proxy device comprises comparing one or more times indicated by the plurality of log entries corresponding to the plurality of packets received by the proxy device with one or more times indicated by the plurality of log entries corresponding to the plurality of packets transmitted by the proxy device.

139. The method of claim 133, wherein the host located in the second network is associated with a malicious entity, the method comprising generating, by the computing system, data configured to cause the first network to drop packets transmitted by the host located in the first network.

140. The method of claim 133, wherein a communication path that interfaces the proxy device and the first network comprises a packet-filtering device, the method comprising:
generating, by the computing system, one or more rules configured to identify packets received from the host located in the first network;
provisioning, by the computing system, the packet-filtering device with the one or more rules configured to identify packets received from the host located in the first network;
identifying, by the packet-filtering device and based on the one or more rules configured to identify packets received from the host located in the first network, at least one packet received from the host located in the first network; and
responsive to identifying the at least one packet received from the host located in the first network, dropping, by the packet-filtering device, the at least one packet received from the host located in the first network.

141. The method of claim 133, comprising:
generating, by the computing system, a message identifying the host located in the first network; and
communicating, by the computing system and to at least one of the host located in the first network or a computing device associated with an administrator of the first network, the message identifying the host located in the first network.

142. A system comprising:
at least one processor; and
a memory storing instructions that when executed by the at least one processor cause the system to:
identify a plurality of packets received by a proxy device from a host located in a first network, the proxy device being configured to receive requests, for data from a host located in a second network, transmitted by the host located in the first network, and the proxy device being configured to generate requests corresponding to the requests transmitted by the host located in the first network and configured to cause the host located in the second network to transmit, to the proxy device, the data from the host located in the second network;
generate a plurality of log entries corresponding to the plurality of packets received by the proxy device;
identify a plurality of packets transmitted by the proxy device to the host located in the second network;
generate a plurality of log entries corresponding to the plurality of packets transmitted by the proxy device;
correlate, based on the plurality of log entries corresponding to the plurality of packets received by the proxy device, the plurality of log entries corresponding to the plurality of packets transmitted by the proxy device, and a comparison of data from the requests transmitted by the host located in the first network with data from the requests corresponding to the requests transmitted by the host located in the first network, the plurality of packets transmitted by the proxy device with the plurality of packets received by the proxy device; and
responsive to correlating the plurality of packets transmitted by the proxy device with the plurality of packets received by the proxy device:
generate data identifying the host located in the first network; and
communicate, to a device located in the first network, the data identifying the host located in the first network.

143. The system of claim 142, wherein the instructions, when executed by the at least one processor, cause the system to correlate the plurality of packets transmitted by the proxy device with the plurality of packets received by the proxy device based on a comparison of one or more ports indicated by the plurality of log entries corresponding to the plurality of packets received by the proxy device with one or more ports indicated by the plurality of log entries corresponding to the plurality of packets transmitted by the proxy device.

144. The system of claim 142, wherein the instructions, when executed by the at least one processor, cause the system to correlate one or more protocol types indicated by the plurality of log entries corresponding to the plurality of packets received by the proxy device with one or more protocol types indicated by the plurality of log entries corresponding to the plurality of packets transmitted by the proxy device.

145. The system of claim 142, wherein the instructions, when executed by the at least one processor, cause the system to correlate the plurality of packets transmitted by the proxy device with the plurality of packets received by the proxy device based on a comparison of application-layer data indicated by the plurality of log entries corresponding to the plurality of packets received by the proxy device with application-layer data indicated by the plurality of log entries corresponding to the plurality of packets transmitted by the proxy device.

146. The system of claim 142, wherein the instructions, when executed by the at least one processor, cause the system to correlate the plurality of packets transmitted by the proxy device with the plurality of packets received by the proxy device based on a comparison of one or more network-interface identifiers indicated by the plurality of log entries corresponding to the plurality of packets received by the proxy device with one or more network-interface identifiers indicated by the plurality of log entries corresponding to the plurality of packets transmitted by the proxy device.

147. The system of claim 142, wherein the instructions, when executed by the at least one processor, cause the system to correlate the plurality of packets transmitted by the proxy device with the plurality of packets received by the proxy device based on a comparison of one or more times indicated by the plurality of log entries corresponding to the plurality of packets received by the proxy device with one or more times indicated by the plurality of log entries corresponding to the plurality of packets transmitted by the proxy device.

148. The system of claim 142, wherein the host located in the second network is associated with a malicious entity, and wherein the instructions, when executed by the at least one processor, cause the system to generate data configured to cause the first network to drop packets transmitted by the host located in the first network.

149. The system of claim 142, wherein a communication link that interfaces the proxy device and the first network comprises a packet-filtering device, and wherein the instructions, when executed by the at least one processor, cause the system to:
generate one or more rules configured to identify packets received from the host located in the first network;
provision the packet-filtering device with the one or more rules configured to identify packets received from the host located in the first network; and
configure the packet-filtering device to:
identify, based on the one or more rules configured to identify packets received from the host located in the first network, at least one packet received from the host located in the first network; and
responsive to identifying the at least one packet received from the host located in the first network, drop the at least one packet received from the host located in the first network.

150. The system of claim 142, wherein the instructions, when executed by the at least one processor, cause the system to:

generate a message identifying the host located in the first network; and
communicate, to at least one of the host located in the first network or a computing device associated with an administrator of the first network, the message identifying the host located in the first network.

151. One or more non-transitory computer-readable media comprising instructions that when executed by a computing system cause the computing system to:
identify a plurality of packets received by a proxy device from a host located in a first network, the proxy device being configured to receive requests, for data from a host located in a second network, transmitted by the host located in the first network, and the proxy device being configured to generate requests corresponding to the requests transmitted by the host located in the first network and configured to cause the host located in the second network to transmit, to the proxy device, the data from the host located in the second network;
generate a plurality of log entries corresponding to the plurality of packets received by the proxy device;
identify a plurality of packets transmitted by the proxy device to the host located in the second network;
generate a plurality of log entries corresponding to the plurality of packets transmitted by the proxy device;
correlate, based on the plurality of log entries corresponding to the plurality of packets received by the proxy device, the plurality of log entries corresponding to the plurality of packets transmitted by the proxy device, and a comparison of data from the requests transmitted by the host located in the first network with data from the requests corresponding to the requests transmitted by the host located in the first network, the plurality of packets transmitted by the proxy device with the plurality of packets received by the proxy device; and
responsive to correlating the plurality of packets transmitted by the proxy device with the plurality of packets received by the proxy device:
generate data identifying the host located in the first network; and
communicate, to a device located in the first network, the data identifying the host located in the first network.

152. The one or more non-transitory computer-readable media of claim 151, wherein the instructions, when executed by the computing system, cause the computing system to correlate the plurality of packets transmitted by the proxy device with the plurality of packets received by the proxy device based on a comparison of one or more ports indicated by the plurality of log entries corresponding to the plurality of packets received by the proxy device with one or more ports indicated by the plurality of log entries corresponding to the plurality of packets transmitted by the proxy device.

153. The one or more non-transitory computer-readable media of claim 151, wherein the instructions, when executed by the computing system, cause the computing system to correlate one or more protocol types indicated by the plurality of log entries corresponding to the plurality of packets received by the proxy device with one or more protocol types indicated by the plurality of log entries corresponding to the plurality of packets transmitted by the proxy device.

154. The one or more non-transitory computer-readable media of claim 151, wherein the instructions, when executed by the computing system, cause the computing system to correlate the plurality of packets transmitted by the proxy device with the plurality of packets received by the proxy device based on a comparison of application-layer data indicated by the plurality of log entries corresponding to the plurality of packets received by the proxy device with application-layer data indicated by the plurality of log entries corresponding to the plurality of packets transmitted by the proxy device.

155. The one or more non-transitory computer-readable media of claim 151, wherein the instructions, when executed by the computing system, cause the computing system to correlate the plurality of packets transmitted by the proxy device with the plurality of packets received by the proxy device based on a comparison of one or more network-interface identifiers indicated by the plurality of log entries corresponding to the plurality of packets received by the proxy device with one or more network-interface identifiers indicated by the plurality of log entries corresponding to the plurality of packets transmitted by the proxy device.

156. The one or more non-transitory computer-readable media of claim 151, wherein the instructions, when executed by the computing system, cause the computing system to correlate the plurality of packets transmitted by the proxy device with the plurality of packets received by the proxy device based on a comparison of one or more times indicated by the plurality of log entries corresponding to the plurality of packets received by the proxy device with one or more times indicated by the plurality of log entries corresponding to the plurality of packets transmitted by the proxy device.

157. The one or more non-transitory computer-readable media of claim 151, wherein the host located in the second network is associated with a malicious entity, and wherein the instructions, when executed by the computing system, cause the computing system to generate data configured to cause the first network to drop packets transmitted by the host located in the first network.

158. The one or more non-transitory computer-readable media of claim 151, wherein a communication link that interfaces the proxy device and the first network comprises a packet-filtering device, and wherein the instructions, when executed by the computing system, cause the computing system to:
generate one or more rules configured to identify packets received from the host located in the first network;
provision the packet-filtering device with the one or more rules configured to identify packets received from the host located in the first network; and
configure the packet-filtering device to:
identify, based on the one or more rules configured to identify packets received from the host located in the first network, at least one packet received from the host located in the first network; and
responsive to identifying the at least one packet received from the host located in the first network, drop the at least one packet received from the host located in the first network.

159. The one or more non-transitory computer-readable media of claim 151, wherein the instructions, when executed by the computing system, cause the computing system to:
generate a message identifying the host located in the first network; and
communicate, to at least one of the host located in the first network or a computing device associated with an administrator of the first network, the message identifying the host located in the first network.

160. A method comprising:
identifying, by a computing system, a plurality of packets received by a gateway device from a host located in a first network, the gateway device being configured to receive, from the host located in the first network, data destined for a host located in a second network, and the gateway device being configured to generate one or more packets, destined for the host located in the second network, encapsulating the data destined for the host located in the second network;
generating, by the computing system, a plurality of log entries corresponding to the plurality of packets received by the gateway device;
identifying, by the computing system, a plurality of packets transmitted by the gateway device to the host located in the second network;
generating, by the computing system, a plurality of log entries corresponding to the plurality of packets transmitted by the gateway device;
correlating, by the computing system and based on the plurality of log entries corresponding to the plurality of packets received by the gateway device, the plurality of log entries corresponding to the plurality of packets transmitted by the gateway device, and a comparison of at least a portion of the data destined for the host located in the second network with data from the one or more packets encapsulating the data destined for the host located in the second network, the plurality of packets transmitted by the gateway device with the plurality of packets received by the gateway device; and
responsive to correlating the plurality of packets transmitted by the gateway device with the plurality of packets received by the gateway device:
generating, by the computing system, data identifying the host located in the first network; and
communicating, by the computing system and to a device located in the first network, the data identifying the host located in the first network.

161. The method of claim 160, wherein correlating the plurality of packets transmitted by the gateway device with the plurality of packets received by the gateway device comprises comparing one or more ports indicated by the plurality of log entries corresponding to the plurality of packets received by the gateway device with one or more ports indicated by the plurality of log entries corresponding to the plurality of packets transmitted by the gateway device.

162. The method of claim 160, wherein correlating the plurality of packets transmitted by the gateway device with the plurality of packets received by the gateway device comprises correlating one or more protocol types indicated by the plurality of log entries corresponding to the plurality of packets received by the gateway device with one or more protocol types indicated by the plurality of log entries corresponding to the plurality of packets transmitted by the gateway device.

163. The method of claim 160, wherein correlating the plurality of packets transmitted by the gateway device with the plurality of packets received by the gateway device comprises comparing application-layer data indicated by the plurality of log entries corresponding to the plurality of packets received by the gateway device with application-layer data indicated by the plurality of log entries corresponding to the plurality of packets transmitted by the gateway device.

164. The method of claim 160, wherein correlating the plurality of packets transmitted by the gateway device with the plurality of packets received by the gateway device comprises comparing one or more network-interface identifiers indicated by the plurality of log entries corresponding to the plurality of packets received by the gateway device with one or more network-interface identifiers indicated by the plurality of log entries corresponding to the plurality of packets transmitted by the gateway device.

165. The method of claim 160, wherein correlating the plurality of packets transmitted by the gateway device with the plurality of packets received by the gateway device comprises comparing one or more times indicated by the plurality of log entries corresponding to the plurality of packets received by the gateway device with one or more times indicated by the plurality of log entries corresponding to the plurality of packets transmitted by the gateway device.

166. The method of claim 160, wherein the host located in the second network is associated with a malicious entity, the method comprising generating, by the computing system, data configured to cause the first network to drop packets transmitted by the host located in the first network.

167. The method of claim 160, wherein a communication path that interfaces the gateway device and the first network comprises a packet-filtering device, the method comprising:
  generating, by the computing system, one or more rules configured to identify packets received from the host located in the first network;
  provisioning, by the computing system, the packet-filtering device with the one or more rules configured to identify packets received from the host located in the first network;
  identifying, by the packet-filtering device and based on the one or more rules configured to identify packets received from the host located in the first network, at least one packet received from the host located in the first network; and
  responsive to identifying the at least one packet received from the host located in the first network, dropping, by the packet-filtering device, the at least one packet received from the host located in the first network.

168. The method of claim 160, comprising:
  generating, by the computing system, a message identifying the host located in the first network; and
  communicating, by the computing system and to at least one of the host located in the first network or a computing device associated with an administrator of the first network, the message identifying the host located in the first network.

169. A system comprising:
  at least one processor; and
  a memory storing instructions that when executed by the at least one processor cause the system to:
    identify a plurality of packets received by a gateway device from a host located in a first network, the gateway device being configured to receive, from the host located in the first network, data destined for a host located in a second network, and the gateway device being configured to generate one or more packets, destined for the host located in the second network, encapsulating the data destined for the host located in the second network;
    generate a plurality of log entries corresponding to the plurality of packets received by the gateway device;
    identify a plurality of packets transmitted by the gateway device to the host located in the second network;
    generate a plurality of log entries corresponding to the plurality of packets transmitted by the gateway device;
    correlate, based on the plurality of log entries corresponding to the plurality of packets received by the gateway device, the plurality of log entries corresponding to the plurality of packets transmitted by the gateway device, and a comparison of at least a portion of the data destined for the host located in the second network with data from the one or more packets encapsulating the data destined for the host located in the second network, the plurality of packets transmitted by the gateway device with the plurality of packets received by the gateway device; and
    responsive to correlating the plurality of packets transmitted by the gateway device with the plurality of packets received by the gateway device:
      generate data identifying the host located in the first network; and
      communicate, to a device located in the first network, the data identifying the host located in the first network.

170. The system of claim 169, wherein the instructions, when executed by the at least one processor, cause the system to correlate the plurality of packets transmitted by the gateway device with the plurality of packets received by the gateway device based on a comparison of one or more ports indicated by the plurality of log entries corresponding to the plurality of packets received by the gateway device with one or more ports indicated by the plurality of log entries corresponding to the plurality of packets transmitted by the gateway device.

171. The system of claim 169, wherein the instructions, when executed by the at least one processor, cause the system to correlate one or more protocol types indicated by the plurality of log entries corresponding to the plurality of packets received by the gateway device with one or more protocol types indicated by the plurality of log entries corresponding to the plurality of packets transmitted by the gateway device.

172. The system of claim 169, wherein the instructions, when executed by the at least one processor, cause the system to correlate the plurality of packets transmitted by the gateway device with the plurality of packets received by the gateway device based on a comparison of application-layer data indicated by the plurality of log entries corresponding to the plurality of packets received by the gateway device with application-layer data indicated by the plurality of log entries corresponding to the plurality of packets transmitted by the gateway device.

173. The system of claim 169, wherein the instructions, when executed by the at least one processor, cause the system to correlate the plurality of packets transmitted by the gateway device with the plurality of packets received by the gateway device based on a comparison of one or more network-interface identifiers indicated by the plurality of log entries corresponding to the plurality of packets received by the gateway device with one or more network-interface identifiers indicated by the plurality of log entries corresponding to the plurality of packets transmitted by the gateway device.

174. The system of claim 169, wherein the instructions, when executed by the at least one processor, cause the system to correlate the plurality of packets transmitted by the gateway device with the plurality of packets received by the gateway device based on a comparison of one or more times indicated by the plurality of log entries corresponding to the plurality of packets received by the gateway device with one or more times indicated by the plurality of log entries corresponding to the plurality of packets transmitted by the gateway device.

175. The system of claim 169, wherein the host located in the second network is associated with a malicious entity, and wherein the instructions, when executed by the at least one processor, cause the system to generate data configured to cause the first network to drop packets transmitted by the host located in the first network.

176. The system of claim 169, wherein a communication link that interfaces the gateway device and the first network comprises a packet-filtering device, and wherein the instructions, when executed by the at least one processor, cause the system to:
  generate one or more rules configured to identify packets received from the host located in the first network;
  provision the packet-filtering device with the one or more rules configured to identify packets received from the host located in the first network; and
  configure the packet-filtering device to:
    identify, based on the one or more rules configured to identify packets received from the host located in the first network, at least one packet received from the host located in the first network; and
    responsive to identifying the at least one packet received from the host located in the first network, drop the at least one packet received from the host located in the first network.

177. The system of claim 169, wherein the instructions, when executed by the at least one processor, cause the system to:
  generate a message identifying the host located in the first network; and
  communicate, to at least one of the host located in the first network or a computing device associated with an administrator of the first network, the message identifying the host located in the first network.

178. One or more non-transitory computer-readable media comprising instructions that when executed by a computing system cause the computing system to:
  identify a plurality of packets received by a gateway device from a host located in a first network, the gateway device being configured to receive, from the host located in the first network, data destined for a host located in a second network, and the gateway device being configured to generate one or more packets, destined for the host located in the second network, encapsulating the data destined for the host located in the second network;
  generate a plurality of log entries corresponding to the plurality of packets received by the gateway device;
  identify a plurality of packets transmitted by the gateway device to the host located in the second network;
  generate a plurality of log entries corresponding to the plurality of packets transmitted by the gateway device;
  correlate, based on the plurality of log entries corresponding to the plurality of packets received by the gateway device, the plurality of log entries corresponding to the plurality of packets transmitted by the gateway device, and a comparison of at least a portion of the data destined for the host located in the second network with data from the one or more packets encapsulating the data destined for the host located in the second network, the plurality of packets transmitted by the gateway device with the plurality of packets received by the gateway device; and
  responsive to correlating the plurality of packets transmitted by the gateway device with the plurality of packets received by the gateway device:
    generate data identifying the host located in the first network; and
    communicate, to a device located in the first network, the data identifying the host located in the first network.

179. The one or more non-transitory computer-readable media of claim 178, wherein the instructions, when executed by the computing system, cause the computing system to correlate the plurality of packets transmitted by the gateway device with the plurality of packets received by the gateway device based on a comparison of one or more ports indicated by the plurality of log entries corresponding to the plurality of packets received by the gateway device with one or more ports indicated by the plurality of log entries corresponding to the plurality of packets transmitted by the gateway device.

180. The one or more non-transitory computer-readable media of claim 178, wherein the instructions, when executed by the computing system, cause the computing system to correlate one or more protocol types indicated by the plurality of log entries corresponding to the plurality of packets received by the gateway device with one or more protocol types indicated by the plurality of log entries corresponding to the plurality of packets transmitted by the gateway device.

181. The one or more non-transitory computer-readable media of claim 178, wherein the instructions, when executed by the computing system, cause the computing system to correlate the plurality of packets transmitted by the gateway device with the plurality of packets received by the gateway device based on a comparison of application-layer data indicated by the plurality of log entries corresponding to the plurality of packets received by the gateway device with application-layer data indicated by the plurality of log entries corresponding to the plurality of packets transmitted by the gateway device.

182. The one or more non-transitory computer-readable media of claim 178, wherein the instructions, when executed by the computing system, cause the computing system to correlate the plurality of packets transmitted by the gateway device with the plurality of packets received by the gateway device based on a comparison of one or more network-interface identifiers indicated by the plurality of log entries corresponding to the plurality of packets received by the gateway device with one or more network-interface identifiers indicated by the plurality of log entries corresponding to the plurality of packets transmitted by the gateway device.

183. The one or more non-transitory computer-readable media of claim 178, wherein the instructions, when executed by the computing system, cause the computing system to correlate the plurality of packets transmitted by the gateway device with the plurality of packets received by the gateway device based on a comparison of one or more times indicated by the plurality of log entries corresponding to the plurality of packets received by the gateway device with one or more times indicated by the plurality of log entries corresponding to the plurality of packets transmitted by the gateway device.

184. The one or more non-transitory computer-readable media of claim 178, wherein the host located in the second network is associated with a malicious entity, and wherein the instructions, when executed by the computing system, cause the computing system to generate data configured to cause the first network to drop packets transmitted by the host located in the first network.

185. The one or more non-transitory computer-readable media of claim 178, wherein a communication link that interfaces the gateway device and the first network comprises a packet-filtering device, and wherein the instructions, when executed by the computing system, cause the computing system to:
  generate one or more rules configured to identify packets received from the host located in the first network;
  provision the packet-filtering device with the one or more rules configured to identify packets received from the host located in the first network; and
  configure the packet-filtering device to:
    identify, based on the one or more rules configured to identify packets received from the host located in the first network, at least one packet received from the host located in the first network; and responsive to identifying the at least one packet received from the host located in the first network, drop the at least one packet received from the host located in the first network.

186. The one or more non-transitory computer-readable media of claim 178, wherein the instructions, when executed by the computing system, cause the computing system to:
generate a message identifying the host located in the first network; and
communicate, to at least one of the host located in the first network or a computing device associated with an administrator of the first network, the message identifying the host located in the first network.

187. A method comprising:
identifying, by a computing system, a plurality of packets received by a network device from a host located in a first network;
generating, by the computing system, a plurality of log entries corresponding to the plurality of packets received by the network device;
identifying, by the computing system, a plurality of packets transmitted by the network device to a host located in a second network;
generating, by the computing system, a plurality of log entries corresponding to the plurality of packets transmitted by the network device;
correlating, by the computing system and based on the plurality of log entries corresponding to the plurality of packets received by the network device and the plurality of log entries corresponding to the plurality of packets transmitted by the network device, the plurality of packets transmitted by the network device with the plurality of packets received by the network device;
responsive to correlating the plurality of packets transmitted by the network device with the plurality of packets received by the network device:
generating, by the computing system, one or more rules configured to identify packets received from the host located in the first network; and
provisioning, by the computing system, a packet-filtering device in a communication path that interfaces the network device and the first network with the one or more rules configured to identify packets received from the host located in the first network; and
identifying, by the packet-filtering device and based on the one or more rules configured to identify packets received from the host located in the first network, at least one packet received from the host located in the first network; and
responsive to identifying the at least one packet received from the host located in the first network, dropping, by the packet-filtering device, the at least one packet received from the host located in the first network.

188. The method of claim 187, wherein correlating the plurality of packets transmitted by the network device with the plurality of packets received by the network device comprises comparing one or more ports indicated by the plurality of log entries corresponding to the plurality of packets received by the network device with one or more ports indicated by the plurality of log entries corresponding to the plurality of packets transmitted by the network device.

189. The method of claim 187, wherein correlating the plurality of packets transmitted by the network device with the plurality of packets received by the network device comprises correlating one or more protocol types indicated by the plurality of log entries corresponding to the plurality of packets received by the network device with one or more protocol types indicated by the plurality of log entries corresponding to the plurality of packets transmitted by the network device.

190. The method of claim 187, wherein correlating the plurality of packets transmitted by the network device with the plurality of packets received by the network device comprises comparing application-layer data indicated by the plurality of log entries corresponding to the plurality of packets received by the network device with application-layer data indicated by the plurality of log entries corresponding to the plurality of packets transmitted by the network device.

191. The method of claim 187, wherein correlating the plurality of packets transmitted by the network device with the plurality of packets received by the network device comprises comparing one or more network-interface identifiers of the network device indicated by the plurality of log entries corresponding to the plurality of packets received by the network device with one or more network-interface identifiers of the network device indicated by the plurality of log entries corresponding to the plurality of packets transmitted by the network device.

192. The method of claim 187, wherein correlating the plurality of packets transmitted by the network device with the plurality of packets received by the network device comprises comparing one or more times indicated by the plurality of log entries corresponding to the plurality of packets received by the network device with one or more times indicated by the plurality of log entries corresponding to the plurality of packets transmitted by the network device.

193. The method of claim 187, comprising:
generating, by the computing system, a message identifying the host located in the first network; and
communicating, by the computing system and to at least one of the host located in the first network or a computing device associated with an administrator of the first network, the message identifying the host located in the first network.

194. A system comprising:
at least one processor; and
a memory storing instructions that when executed by the at least one processor cause the system to:
identify a plurality of packets received by a network device from a host located in a first network;
generate a plurality of log entries corresponding to the plurality of packets received by the network device;
identify a plurality of packets transmitted by the network device to a host located in a second network;
generate a plurality of log entries corresponding to the plurality of packets transmitted by the network device;
correlate, based on the plurality of log entries corresponding to the plurality of packets received by the network device and the plurality of log entries corresponding to the plurality of packets transmitted by the network device, the plurality of packets transmitted by the network device with the plurality of packets received by the network device; and
responsive to correlating the plurality of packets transmitted by the network device with the plurality of packets received by the network device:
generate one or more rules configured to identify packets received from the host located in the first network;
provision a packet-filtering device in a communication path that interfaces the network device and the first network with the one or more rules configured to identify packets received from the host located in the first network; and configure the packet-filtering device to:
    identify, based on the one or more rules configured to identify packets received from the host located in the first network, at least one packet received from the host located in the first network; and
    responsive to identifying the at least one packet received from the host located in the first network, drop the at least one packet received from the host located in the first network.

195. The system of claim 194, wherein the instructions, when executed by the at least one processor, cause the system to correlate the plurality of packets transmitted by the network device with the plurality of packets received by the network device based on a comparison of one or more ports indicated by the plurality of log entries corresponding to the plurality of packets received by the network device with one or more ports indicated by the plurality of log entries corresponding to the plurality of packets transmitted by the network device.

196. The system of claim 194, wherein the instructions, when executed by the at least one processor, cause the system to correlate one or more protocol types indicated by the plurality of log entries corresponding to the plurality of packets received by the network device with one or more protocol types indicated by the plurality of log entries corresponding to the plurality of packets transmitted by the network device.

197. The system of claim 194, wherein the instructions, when executed by the at least one processor, cause the system to correlate the plurality of packets transmitted by the network device with the plurality of packets received by the network device based on a comparison of application-layer data indicated by the plurality of log entries corresponding to the plurality of packets received by the network device with application-layer data indicated by the plurality of log entries corresponding to the plurality of packets transmitted by the network device.

198. The system of claim 194, wherein the instructions, when executed by the at least one processor, cause the system to correlate the plurality of packets transmitted by the network device with the plurality of packets received by the network device based on a comparison of one or more network-interface identifiers of the network device indicated by the plurality of log entries corresponding to the plurality of packets received by the network device with one or more network-interface identifiers of the network device indicated by the plurality of log entries corresponding to the plurality of packets transmitted by the network device.

199. The system of claim 194, wherein the instructions, when executed by the at least one processor, cause the system to correlate the plurality of packets transmitted by the network device with the plurality of packets received by the network device based on a comparison of one or more times indicated by the plurality of log entries corresponding to the plurality of packets received by the network device with one or more times indicated by the plurality of log entries corresponding to the plurality of packets transmitted by the network device.

200. The system of claim 194, wherein the instructions, when executed by the at least one processor, cause the system to:
    generate a message identifying the host located in the first network; and
    communicate, to at least one of the host located in the first network or a computing device associated with an administrator of the first network, the message identifying the host located in the first network.

201. One or more non-transitory computer-readable media comprising instructions that when executed by a computing system cause the computing system to:
    identify a plurality of packets received by a network device from a host located in a first network;
    generate a plurality of log entries corresponding to the plurality of packets received by the network device;
    identify a plurality of packets transmitted by the network device to a host located in a second network;
    generate a plurality of log entries corresponding to the plurality of packets transmitted by the network device;
    correlate, based on the plurality of log entries corresponding to the plurality of packets received by the network device and the plurality of log entries corresponding to the plurality of packets transmitted by the network device, the plurality of packets transmitted by the network device with the plurality of packets received by the network device; and
    responsive to correlating the plurality of packets transmitted by the network device with the plurality of packets received by the network device:
        generate one or more rules configured to identify packets received from the host located in the first network;
        provision a packet-filtering device in a communication path that interfaces the network device and the first network with the one or more rules configured to identify packets received from the host located in the first network; and
        configure the packet-filtering device to:
            identify, based on the one or more rules configured to identify packets received from the host located in the first network, at least one packet received from the host located in the first network; and
            responsive to identifying the at least one packet received from the host located in the first network, drop the at least one packet received from the host located in the first network.

202. The one or more non-transitory computer-readable media of claim 201, wherein the instructions, when executed by the computing system, cause the computing system to correlate the plurality of packets transmitted by the network device with the plurality of packets received by the network device based on a comparison of one or more ports indicated by the plurality of log entries corresponding to the plurality of packets received by the network device with one or more ports indicated by the plurality of log entries corresponding to the plurality of packets transmitted by the network device.

203. The one or more non-transitory computer-readable media of claim 201, wherein the instructions, when executed by the computing system, cause the computing system to correlate one or more protocol types indicated by the plurality of log entries corresponding to the plurality of packets received by the network device with one or more protocol types indicated by the plurality of log entries corresponding to the plurality of packets transmitted by the network device.

204. The one or more non-transitory computer-readable media of claim 201, wherein the instructions, when executed by the computing system, cause the computing system to correlate the plurality of packets transmitted by the network device with the plurality of packets received by the network device based on a comparison of application-layer data indicated by the plurality of log entries corresponding to the plurality of packets received by the network device with application-layer data indicated by the plurality of log entries corresponding to the plurality of packets transmitted by the network device.

205. The one or more non-transitory computer-readable media of claim 201, wherein the instructions, when executed by the computing system, cause the computing system to correlate the plurality of packets transmitted by the network device with the plurality of packets received by the network device based on a comparison of one or more network-interface identifiers of the network device indicated by the plurality of log entries corresponding to the plurality of packets received by the network device with one or more network-interface identifiers of the network device indicated by the plurality of log entries corresponding to the plurality of packets transmitted by the network device.

206. The one or more non-transitory computer-readable media of claim 201, wherein the instructions, when executed by the computing system, cause the computing system to correlate the plurality of packets transmitted by the network device with the plurality of packets received by the network device based on a comparison of one or more times indicated by the plurality of log entries corresponding to the plurality of packets received by the network device with one or more times indicated by the plurality of log entries corresponding to the plurality of packets transmitted by the network device.

207. The one or more non-transitory computer-readable media of claim 201, wherein the instructions, when executed by the computing system, cause the computing system to:
  generate a message identifying the host located in the first network; and
  communicate, to at least one of the host located in the first network or a computing device associated with an administrator of the first network, the message identifying the host located in the first network.

\* \* \* \* \*